United States Patent [19]

Ohno

[11] Patent Number: 5,512,938
[45] Date of Patent: Apr. 30, 1996

[54] TELECONFERENCE TERMINAL

[75] Inventor: Kenzo Ohno, Habikino, Japan

[73] Assignee: Matsushita Electric Industrial CO., Ltd., Osaka, Japan

[21] Appl. No.: 413,631

[22] Filed: Mar. 30, 1995

[30] Foreign Application Priority Data

Apr. 6, 1994 [JP] Japan .................................. 6-068372

[51] Int. Cl.⁶ ................................................. H04M 11/00
[52] U.S. Cl. ............................... 348/15; 379/94; 379/96; 379/202
[58] Field of Search ................................ 348/12, 14–20; 379/201, 202, 93, 96–98, 94

[56] References Cited

U.S. PATENT DOCUMENTS 5,072,442  12/1991  Todd ......................................... 348/15
5,374,952  12/1994  Flohr ......................................... 348/12

OTHER PUBLICATIONS

"Line Transmission of Non–Telephone Signals", Narrow-–Band Visual Telephone Systems and Equipment, CCITT, Recommendation H.320, Geneva 1990.

Primary Examiner—Wing Fu Chan
Attorney, Agent, or Firm—Price, Gess & Ubell

[57]  ABSTRACT

In the PC-based teleconference terminal 200 includes a PC 110 and a video codec unit 130, a network control unit 220 and an audio codec unit 240 which are all constructed on the same expansion board, with the video codec unit 130, the audio codec unit 240 and the network control unit 240 all connected to the computer bus 114 so as to be able to transfer audio data, video data, data and AV multiframes between themselves. The audio codec unit 240 is equipped with a audio clock generation unit 241 for generating an audio sampling signal of 8 kHz through self-excited oscillation. The CPU 111 in the PC 110 executes frame alignment by executing the AV multiplexer/separator software 212 stored in the memory 112 and executes the AV multiframe conversion and separation for H series recommendation on the CCITT, as well as adjusting any shortages or surpluses of reproduction audio data which arise due to synchronization slips between the audio sampling clock and the network clock by executing the synchronization slip control software 211.

25 Claims, 13 Drawing Sheets

PC-BASED TELECONFERENCE TERMINAL 200

FIGURE 3

FORMAT OF AV MULTIFRAMES

V  VIDEO TRANSMISSION AREA
A  AUDIO TRANSMISSION AREA
D  DATA TRANSMISSION AREA
FAS  FRAME ALIGNMENT SIGNAL
BAS  BIT-RATE ALLOCATION SIGNAL

| FIRST B CHANNEL | | | | | | | | SECOND B CHANNEL | | | | | | | |
|---|---|---|---|---|---|---|---|---|---|---|---|---|---|---|---|
| Bit1 | Bit2 | Bit3 | Bit4 | Bit5 | Bit6 | Bit7 | Bit8 | Bit1 | Bit2 | Bit3 | Bit4 | Bit5 | Bit6 | Bit7 | Bit8 |
| A | A | V | V | V | V | V | FAS | V | V | V | V | V | V | V | FAS |
| A | A | V | V | V | V | V | | V | V | V | V | V | V | V | |
| A | A | | | | | | BAS | | | | | | | | BAS |
| | | | | | | | D | | | | | | | | V |
| A | A | V | V | V | V | V | D | V | V | V | V | V | V | V | V |

PC-BASED TELECONFERENCE TERMINAL 100

AUDIO CODEC UNIT 940

TELECONFERENCE TERMINAL

BACKGROUND OF THE INVENTION

1. Field of the Invention

The present invention relates to a teleconference terminal connected to other such terminals located at remote points by a network, which can inter-communicatively execute teleconferencing by transmitting audio and video information in a multiplex format using line switching on an ISDN line.

2. Description of the Related Art

In recent years, the use of ISDN lines has become commonplace, and this, as well as the establishment of a CCITT recommendations, such as H series, as standard protocols for teleconference transmission, and the reductions in the cost of TV picture codecs have led to the development of teleconference terminals, based on widely-used personal computers (PC), which are capable of video telephone services using ISDN networks. This kind of teleconference terminal is known as a PC-based teleconference terminal.

FIG. 1 shows a construction of an PC-based teleconference terminal 100 according to the related art. This PC-based teleconference terminal 100 is a terminal for H.320 recommendation on the CCITT, and is principally comprised of a PC 110 and an AV unit 170. The AV unit 170 is constructed as an single enclosed unit, and includes a specialized network control unit 120, a video codec unit 130, an audio codec unit 140, a CPU interface 160, a control bus 161, and a time sharing bus 162. The PC 110, the video codec unit 130, and the audio codec unit 140 are connected to the display unit 150, the camera 151 and the microphone 152 and speaker 153, respectively.

The PC 110 is made up of the CPU 111, a memory 112 and a display control unit 113 and the computer bus 114.

The CPU 111 is composed of a widely-used microprocessor, and executes data processing using the data received from the ISDN line by executing a program stored in the memory 112.

The memory 112 stores the programs to be executed by the CPU 111, as well as providing the working-storage for when the CPU 111 is executing data processing.

The display control unit 113 controls the operation of the display unit 150 and has the video signals expanded and decoded by the video codec unit 130 displayed by the display unit 150. The display control unit 113 is equipped with a function for having a number of images superimposed and displayed by the display unit 150.

The computer bus 114 provides the data transfer lines for connecting all of the components inside the PC 110 with the CPU interface 160 in the AV unit 170.

The specialized network control unit 120 is comprised of a line switching connection processing unit 121, an ISDN line interface unit 122, a network clock control unit 123 and an AV multiplexer/separator unit 124.

The line switching connection processing unit 121, executes the processes connecting and disconnecting the line switching on the D channel of the ISDN line via the ISDN line interface unit 122, in accordance with control data such as call requests from the CPU 111 inputted via the CPU bus 160.

The ISDN line interface unit 122 is a standard ISDN line interface shown at the regulated S/T point.

The network clock control unit 123 generates a clock which is synchronized to the transfer rate of the ISDN line, which it supplies to the line switching connection processing unit 121 and the AV multiplexer/separator unit 124.

The AV multiplexer/separator unit 124 is realized by a specialized LSI circuit, and separates the AV multiframes sent on the B channel of the ISDN line into video code and audio code, which it inputs into the video codec unit 130 and audio codec unit 140, respectively, via the time sharing bus 162. It also converts audio code from the audio codec unit 140 and video code from the video codec unit 130 received via the time sharing bus 162, along with a frame alignment signal (FAS) and a bit-rate allocation signal (BAS), into AV multiframes, which it then transfers to the ISDN line interface unit 122.

The video codec unit 130 is comprised of a D/A convertor 131, an A/D convertor 132, a video clock generation unit 133, and video codec circuit 134. The video codec unit 130 is also connected to the camera 151. The video codec unit 130 performs the compression and encoding of video data and the expansion and decoding of video code, based on the video sampling signal which is synchronized with the video signal from the camera 151. In the following explanation, video information expressed as a digital value which has undergone sampling by the video signal will be referred to as "video data", while compressed and encoded image data will be referred to as "video code".

The D/A convertor 131 converts the video data expanded and decoded by the video codec circuit 134 into an analogue signal and sends it to the display control unit 113.

The A/D convertor 132 converts the analogue signal received from the camera 151 in accordance with the video sampling signal, in doing so generating video data.

The video codec circuit 134 has a memory capacity for one second of frame data, and compresses and encodes the video data received from the A/D convertor 132 in accordance with CCITT recommendation H.261. It also expands and decodes the received video code based on the same standard.

The audio codec unit 140 performs the expansion and decoding of audio data, based on the audio sampling signal which is synchronized with the transfer speed of the ISDN line which is supplied by the network clock control unit 123. Accordingly, the audio sampling signal is a clock signal having a frequency of 8 kHz.

The D/A convertor 141 converts the audio data decoded by the audio codec circuit 143 into an analogue signal, based on the audio sampling signal, and sends it to the speaker 153.

The A/D convertor 142 samples the analogue signal received from the microphone 151 and converts it into a digital signal in accordance with the audio sampling signal, in doing so generating audio data.

The audio codec circuit 143 compresses and encodes the audio data received from the A/D convertor 142 based on TTC standard JT-G722, G728 or suchlike. It also decodes and expands the audio code which is separated from the received AV multiframes, based on a said same standard.

In the following explanation, audio information expressed as a series of digital values which has undergone sampling by the audio signal will be referred to as "audio data", while expanded and decoded audio data will be referred to as "audio code".

The display unit 150, is comprised, for example, of a CRT or an LCD.

The camera 151 is comprised of an image pick-up device such as a CCD (charge couple device).

The microphone 152 converts the inputted sound into an audio signal which is an electric signal, which it then outputs to the A/D convertor 142.

The speaker 153 reproduces the audio information in the audio signal received from the D/A convertor 141.

The CPU interface 160 is connected to the computer bus 114 and the control bus 161, and allows the transfer of control data between the PC 110 and the AV unit 170.

The control bus 161 transmits the control data between the CPU interface 160 and every component in the AV unit 170.

The time sharing bus 162 is connected to the AV multiplexer/separator unit 124, the video codec circuit 134 and the audio codec circuit 143, and transfers video code and audio code using a time sharing method.

In the PC-based teleconference terminal 100 constructed as described above, AV multiframes received on the B channel of the ISDN line are separated by the AV multiplexer/separator unit 124, with the video code and audio code being sent directly to the video codec unit 130 and the audio codec unit 140, respectively, via the time sharing bus 162, without passing through the PC 110. In the same way, video code from the video codec unit 130 and audio code from the audio codec unit 140 are sent directly via the time sharing bus 162, without passing through the computer PC 110, to the AV multiplexer/separator unit 124 where they are converted into multiframes are transmitted on the ISDN line.

However, for the PC-based teleconference terminal 100 under the related art, in order to execute teleconferencing, it has been necessary to provide a general use PC with an AV unit 170 which is separate from the PC 110 and which cannot be directly connected to the computer bus in the PC 110, so that such systems have had the drawbacks of high cost, difficulties regarding reduction in scale, and poor potential for expansion.

More specifically, these problems are as described below.

1. For the PC-based teleconference terminal 100, a specialized network control unit 120 is provided in the AV unit 170, so that if the PC 110 features its own network control unit capable of ISDN line switching, such as an ISDN board, there will be a duplicity of network control units capable of ISDN line switching. Therefore, it can be seen that the hardware resources available in the PC 110 are not being used to their full potential.

2. Since the multiframe conversion and separation are executed by an AV multiplexer/separator unit 124 constructed from a special use LSI circuit which is provided outside the PC 110, the cost of the system becomes high, and reduction of the scale of the system becomes problematic.

3. Since transfer of video code and audio code between the specialized network control unit 120, the video codec unit 130 and the audio codec unit 140 is executed without passing through the PC 110, it is not possible for the PC 110 to control the flow of video code and audio code. Also, in order for the PC 110 to control the flow of video code and audio code and to store the video code and audio code on the hard disks disposed in the PC 110, a new specialized network control unit 120, and specialized interface software become necessary.

4. Since the specialized network control unit 120 is a specialized network control unit for the AV unit 170, then it cannot use the resources included in the PC 110, such as network control software.

It is possible to conceive a system which does not make use of a separate AV unit 170, wherein a method for the transfer of video code and audio code is achieved with video and audio codec circuits being connected to an AV multiplexer/separator unit composed of software in the PC 110 via the computer bus 114 of the PC 110. However, under such a method, the audio sampling signal in the audio codec unit 140 for the generation of audio code will not be synchronized to the network clock for the ISDN line, so that when the generated video code and audio code are reproduced by the receiver, synchronization slips will occur. In such a case, since especially audio data is reproduced for serial bits, then there will be the problems of audio interference and gaps in the audio signal.

SUMMARY OF THE INVENTION

It is the object of the present invention to provide a teleconference terminal which can overcome the problems such as gaps in the audio signal, and which makes effective use of the hardware and software resources in a PC, and so is of low cost and compact size, as well-as allowing for the expansion of its capacity.

The above object can be achieved by a teleconference terminal using a personal computer for sending and receiving video code, audio code and data to and from another teleconference terminal, using an ISDN line switching method wherein AV multiframes are defined for an H series recommendation for CCITT, comprising: an audio coding unit for encoding and compressing an inputted audio signal in accordance with an audio sampling signal, for generating transmission audio code and outputting the transmission audio code to a computer bus, as well as receiving reproduction audio code from the computer bus, and generating a reproduction audio signal by decompressing and decoding the reproduction audio code in accordance with the audio sampling signal; a video coding unit for encoding and compressing an inputted video signal, for generating transmission video code and outputting the transmission video code to the computer bus, as well as receiving reproduction video code from the computer bus, and generating a reproduction video signal by expanding and decoding the reproduction video code; an AV multiframe conversion unit for generating transmission AV multiframes by performing multiplex conversion of the transmission audio code and the transmission video code inputted from the computer bus according to a CCITT recommendation, and outputting the generated transmission AV multiframes to the computer bus; a transfer unit for transmitting the transmission AV multiframes inputted from the computer bus via an ISDN line to the other teleconference terminal, and for receiving reproduction AV multiframes from the other teleconference terminal according to a CCITT recommendation via the ISDN line, and outputting the received reproduction AV multiframes to the computer bus; an AV separation unit for receiving the received reproduction AV multiframes from the computer bus and for separating the reproduction video code and the reproduction audio code from the received reproduction AV multiframes, as well as outputting the reproduction video code and reproduction audio code to the computer bus; an internal clock supplying unit for independently generating an internal clock for the personal computer, as well as supplying the audio sampling signal synchronized with the internal clock to the audio coding unit, wherein the audio sampling signal has a frequency of 8 kHz; and an adjustment unit for adjusting surpluses and shortages in the transmission audio code to be included in the transmission AV multiframes, which occur due to synchronization slips between a network clock of the ISDN line and the internal clock, and surpluses and shortages in the reproduction audio code separated from the reproduction AV multiframes, which occur due to synchronization slips between the network clock of the ISDN line and the internal clock.

By using the construction described above, data such as audio code, video code, and AV multiframes can be inputted into the PC using the computer bus, so that by having the CPU execute programs stored in the PC's memory, a variety of processes such as a synchronization slip control process or the multiplex formation or separation of AV multiframes can be performed for the data, thereby using the PC's software resources effectively. Additionally, processes which were executed using LSI in the related art can be achieved by the CPU, so that the potential for expansion is increased, and reductions in the size and cost of the teleconference terminal corresponding to the size and cost of the specialized LSI can be made.

Also, the teleconference terminal may not comprise an internal clock supplying unit and an adjustment unit, wherein the transfer unit may include a clock distribution circuit for distributing the network clock of the ISDN line, and a special connector may be formed in each of the transfer unit and the audio coding unit, with a private clock signal line connected between the special connectors, so that the network clock distributed by the clock distribution circuit may be supplied via the private clock signal line to the audio coding unit.

Also, the count-up pulse generation unit may include: an I/O decoder for decoding a transfer address of the fixed amount of the reproduction audio code transferred via the computer bus, and, when the transfer address is the audio coding unit, for generating a write pulse for writing data in the reproduction audio code into the audio coding unit, as well as generating a register write pulse; an audio setting register for retrieving a number of audio samples written at a start of the reproduction audio code in accordance with the register write pulse and for storing the number of audio samples; a flip flop which is set according to the write pulse for the audio coding unit and reset by a clear signal; a counter for counting up a number of clock pulses inputted while the flip flop is set, and for being reset to [1] when the flip flop is reset; an agreement circuit for outputting the clear signal to the flip flop when a count value of the counter is equal to the number of audio samples stored by the audio setting register; an AND circuit for outputting the clock pulses as the count-up signal while the flip flop is set; and a clock oscillator for supplying the clock pulses to the flip flop, the counter and the AND gate.

By means of the above constructions, the additional benefit of having the audio sampling signal synchronized to the network clock can be attained, so that synchronization slips do not occur.

BRIEF DESCRIPTION OF THE DRAWINGS

These and other objects, advantages and features of the invention will become apparent from the following description taken in con 3unction with the accompanying drawings which illustrate a specific embodiment of the invention. In the drawings:

FIG. 3 is a figure showing the data format of AV multiframes for CCITT H series recommendation on the base ISDN line;

DESCRIPTION OF THE PREFERRED EMBODIMENTS

Embodiment 1

Figure 1:
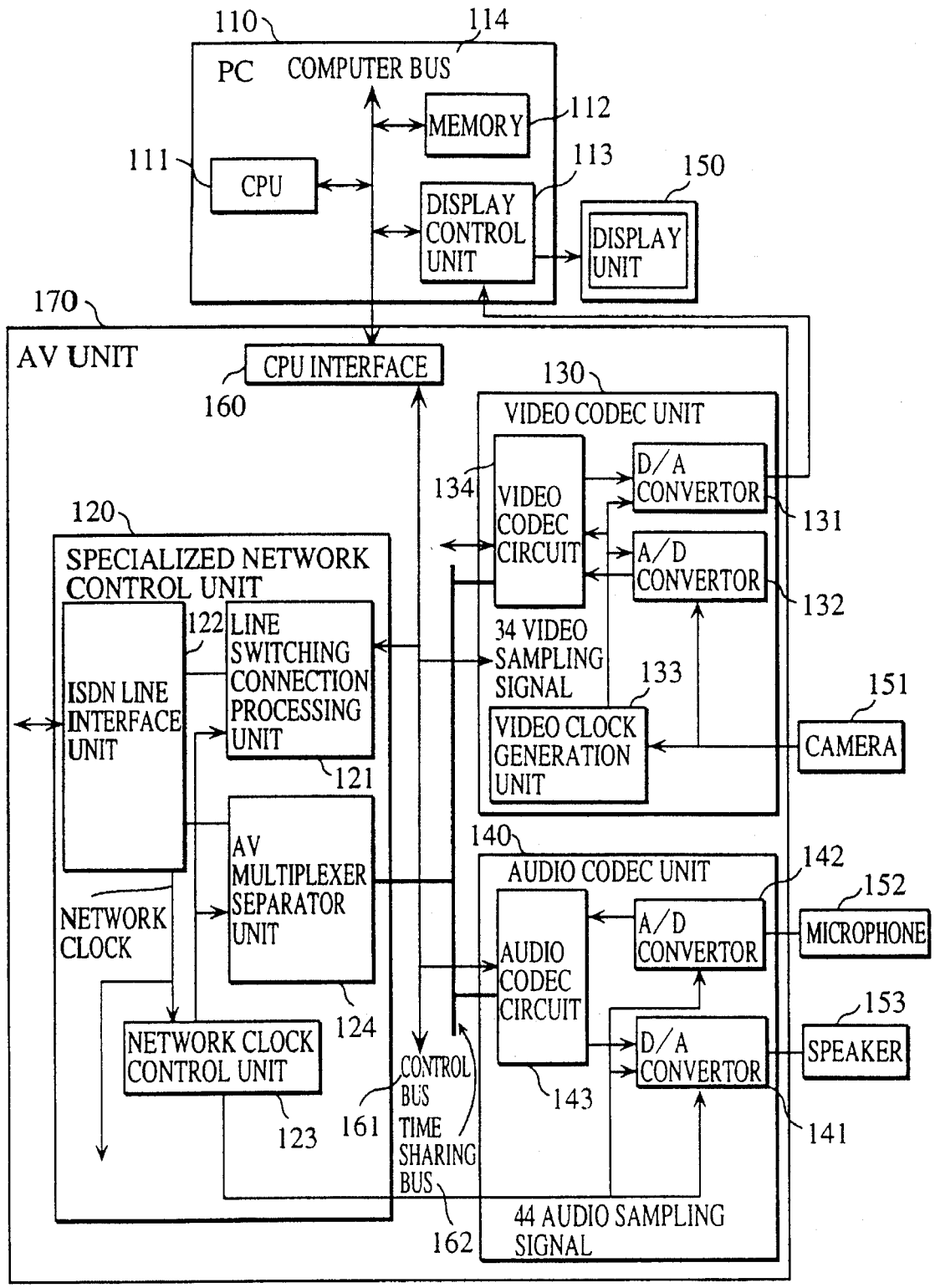
FIG. 1 is a block diagram showing a teleconference terminal constructed according to the related art.
Figure 2:
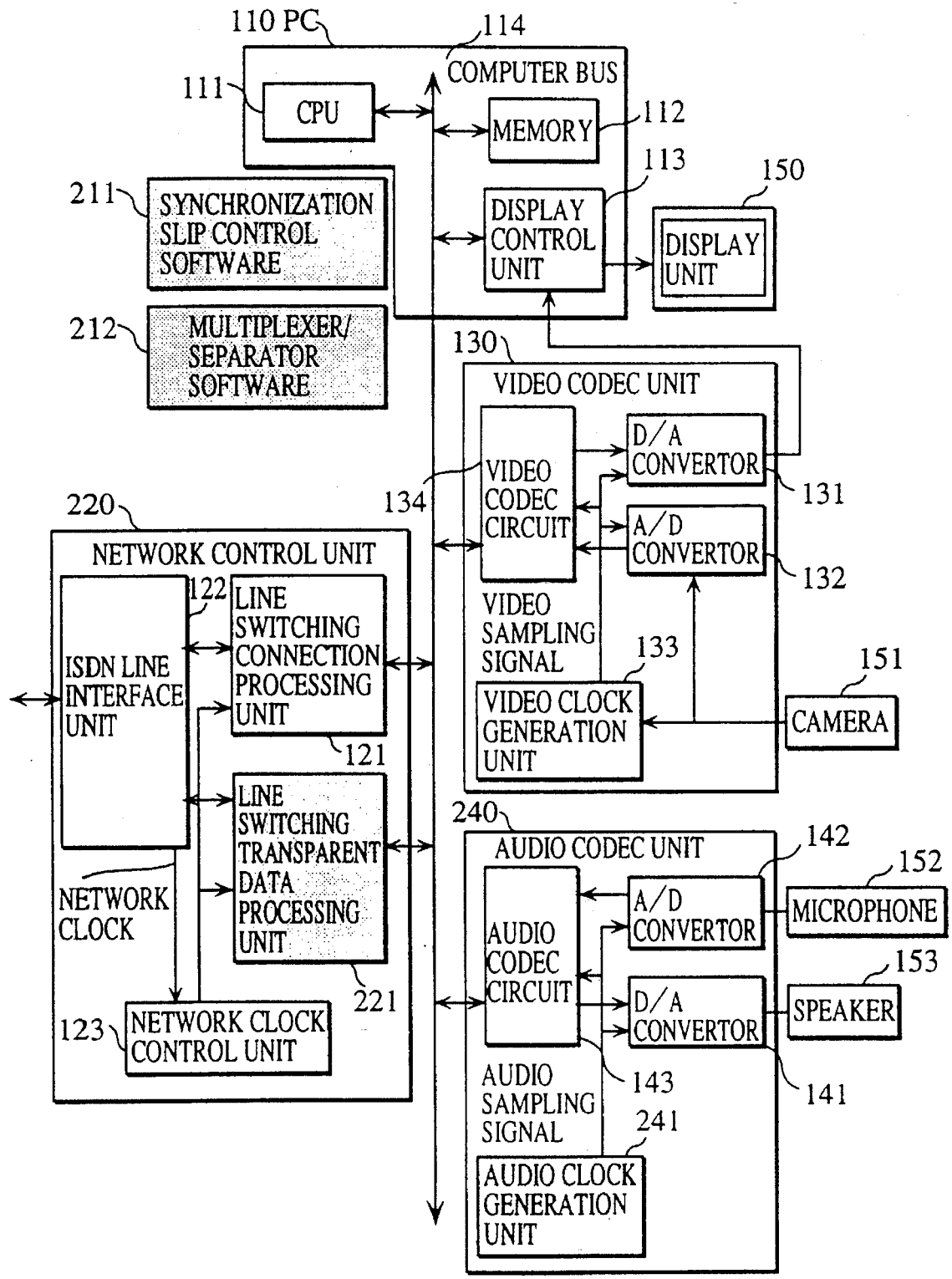
FIG. 2 is a block diagram showing the construction of the PC-based teleconference terminal 200 constructed according to the first embodiment of the present invention.

FIG. 2 is a block diagram showing the construction of the PC-based teleconference terminal 200 constructed according to the first embodiment of the present invention. The PC-based teleconference terminal 200 of the present embodiment is principally constructed from a PC 110, a video codec unit 130, a network control unit 220 and an audio codec unit 240. It should be noted that the video codec unit 130, the network control unit 220 and the audio codec unit 240 are all constructed on the same board, which is then inserted into the expansion slot of the PC 110. Each of the said units are connected to the PC 110 using the computer bus 114 which is the signal line of the expansion slot, and are not connected by any special private lines. The PC 110, the video codec unit 130, and the audio codec unit 240 are additionally connected, in the same way as the PC-based teleconference terminal 100, to the display unit 150, the camera 151, the microphone 152 and the speaker 153. The synchronization slip control software 211 and the multiplexer/separator software 212 are stored in the memory 112. In this FIG. 2, components which are the same as those shown in FIG. 1 have been given the same reference numerals, and their explanation has been omitted.

The main memory, composed, for example, of DRAM, includes storage areas such as the transmission video buffer 404, the transmission audio buffer 440, the transmission buffer 454, the reception video buffer 504, the reception audio buffer 540 and the reception buffer 555. Also, as a new function, the memory 112 stores the synchronization slip control software 211 and the multiplexer/separator software 212.

The computer bus 114 is the expansion bus for the PC 110, for example, the AT bus used by IBM computers.

The synchronization slip control software 211 is a transmission control program stored by the memory 112. By the CPU 111 executing the synchronization slip control software 211, the effects on audio reproduction of shortages and surpluses of audio information (called synchronization slips), which arise when the audio sampling rate of the audio codec unit 240 under the present invention cannot be set equal to the network transmission rate of the ISDN line, can be reduced.

More specifically, when the amount of audio code 441 or audio code 541 which is queued in the transmission audio buffer 440 or in the reception audio buffer 540 is below a value set as the low mark 433 or the low mark 533, the CPU 110 judges that such a synchronization slip will occur due to the shortage of audio data. When there is a shortage of audio data due to a synchronization slip on transmission, then the CPU 111 sends the audio code with the lowest amount of audio code out of all of the queued audio code in the transmission audio buffer 440 twice to the transmission buffer 454. Alternatively, the CPU 111, may calculate the average of the audio sample values included in the audio code with a lowest amount of sound energy and the audio code queued so as to follow the audio code with a lowest amount of sound energy, and then generate audio code whose audio code is set at this average value, with this audio code then sent following the audio code with a lowest amount of sound energy to the transmission buffer 454.

Also, when there is a shortage of audio data due to a synchronization slip on reception, then the CPU 111 sends the audio code with the lowest amount of audio code out of all of the queued audio code in the reception audio buffer 540 twice to the audio codec circuit 143. Alternatively, the CPU 110 may calculate the average of the audio sample values included in the audio code with a lowest amount of sound energy and the audio code queued so as to follow after the audio code with a lowest amount of sound energy, and then generate audio code whose audio code is set at this average value, with this audio code then sent following the audio code with a lowest amount of sound energy to the audio codec circuit 143. In doing so, when there is a synchronization slip due to a shortage of data, the audio data with the lowest amount of sound energy will be used for stuffing the gaps in the audio data.

In the same way, when the amount of audio code 441 or audio code 541 which is queued in the transmission audio buffer 440 or in the reception audio buffer 540 is above a value set as the high mark 432 or the high mark 532, the CPU 111 judges that a synchronization slip will occur due to a surplus of audio data. When there is a synchronization slip due to a surplus of audio data on transmission, then the CPU 111 ignores the audio code with the lowest amount of audio energy and, by not sending it to the transmission buffer 54, discards the audio code. Alternatively, the CPU 111, may calculate the average of the audio sample values included in the audio codes queued so as to precede and follow the audio code with a lowest amount of sound energy, and then generate audio code whose audio code is set at this average value, with this generated audio code then being sent to the transmission buffer 454 in place of the audio code following after the audio code with the lowest amount of sound energy, with the audio code with the lowest amount of sound energy and the audio code following after the audio code with the lowest amount of sound energy being discarded. In the same way when there is a surplus of audio data due to a synchronization slip on reception, then the CPU 111 ignores the audio code with the lowest amount of audio energy and, by not sending it to the audio codec circuit 143, discards the audio code. Alternatively, the CPU 111, may calculate the average of the audio sample values included in the audio codes queued so as to precede and after the audio code with a lowest amount of sound energy, and then generate audio code whose audio code is set at this average value, with this generated audio code then being sent to the audio codec circuit 143 in place of the audio code following after the audio code with the lowest amount of sound energy, with audio code with a lowest amount of sound energy and the audio code following after the audio code with the lowest amount of sound energy being discarded.

The multiplexer/separator software 212 is a transmission control program stored by the memory 112. By the CPU 111 executing the multiplexer/separator software 212, the processes generating AV multiframes or separating multiframes for this invention can be performed according to H.221 recommendation for the CCITT, in the same way as with the AV multiplexer/separator unit 124.

The network control unit 220 includes an ISDN line interface unit 122, a line switching connection processing unit 121, and a network clock control unit 123. It includes also includes, as a new component, a line switching transparent data processing unit 221 in place of the AV multiplexer/separator unit 124.

The line switching transparent data processing unit 221 temporarily stores the AV multiframes inputted into the ISDN line interface unit 122, as well as splitting them up, for example into sections of 80 bytes, and sending them transparently in unrestricted digital, that is to say, as they are, to the computer bus 114. It also temporarily stores the AV multiframes inputted into from the CPU 111 via the computer bus 114 and sends them as they are to the ISDN line interface unit 122.

The network clock control unit 123 generates the internal clocks for the line switching connection processing unit 121 and the line switching transparent data processing unit 221 from the network clock inputted from the ISDN line interface unit 122. The network clock is a clock which is synchronized with the transfer rate of the ISDN line, so that it is a clock signal of frequency 8 kHz, otherwise known as octet timing.

The video codec unit 130 is made up of the D/A convertor 131, the A/D convertor 132, the video clock generation unit 133 and the video codec circuit 134.

The video clock generation unit 133 generates the video sampling signal synchronized with the video signal input from the camera 151. The video sampling signal is, for example, a sampling signal of frequency 13.5 MHz in accordance with H series recommendation for the CCITT.

The video codec circuit 134 includes a buffer memory (FIFO) for the video code sent to and received from the CPU 111.

The audio codec unit 240 is made up of the D/A convertor 141, the A/D convertor 142, the audio codec circuit 143 and the audio clock generation unit 241.

The audio clock generation unit 241 generates the audio sampling signal through self-excited oscillation. This audio sampling signal is a clock signal of frequency 8 kHz which is independent of the transfer rate of the ISDN line.

FIG. 3 is a figure showing the data format of AV multiframes for the H series recommendation for the CCITT on the basic rate of the ISDN line (128 kbps). Bit 1 to bit 8 on the first B channel and the second B channel are called the subchannels. The network control unit 220 sends the audio code A using subchannels 1 and 2 on the first B channel, and sends data D on subchannel 8 on the second B channel in the same way the frame alignment signal (FAS) and the bit-rate allocation signal (BAS) are sent using the subchannel 8 on the first B channel and the second B channel, with the rest of the subchannels being used to transmit video code V.

Figure 4:
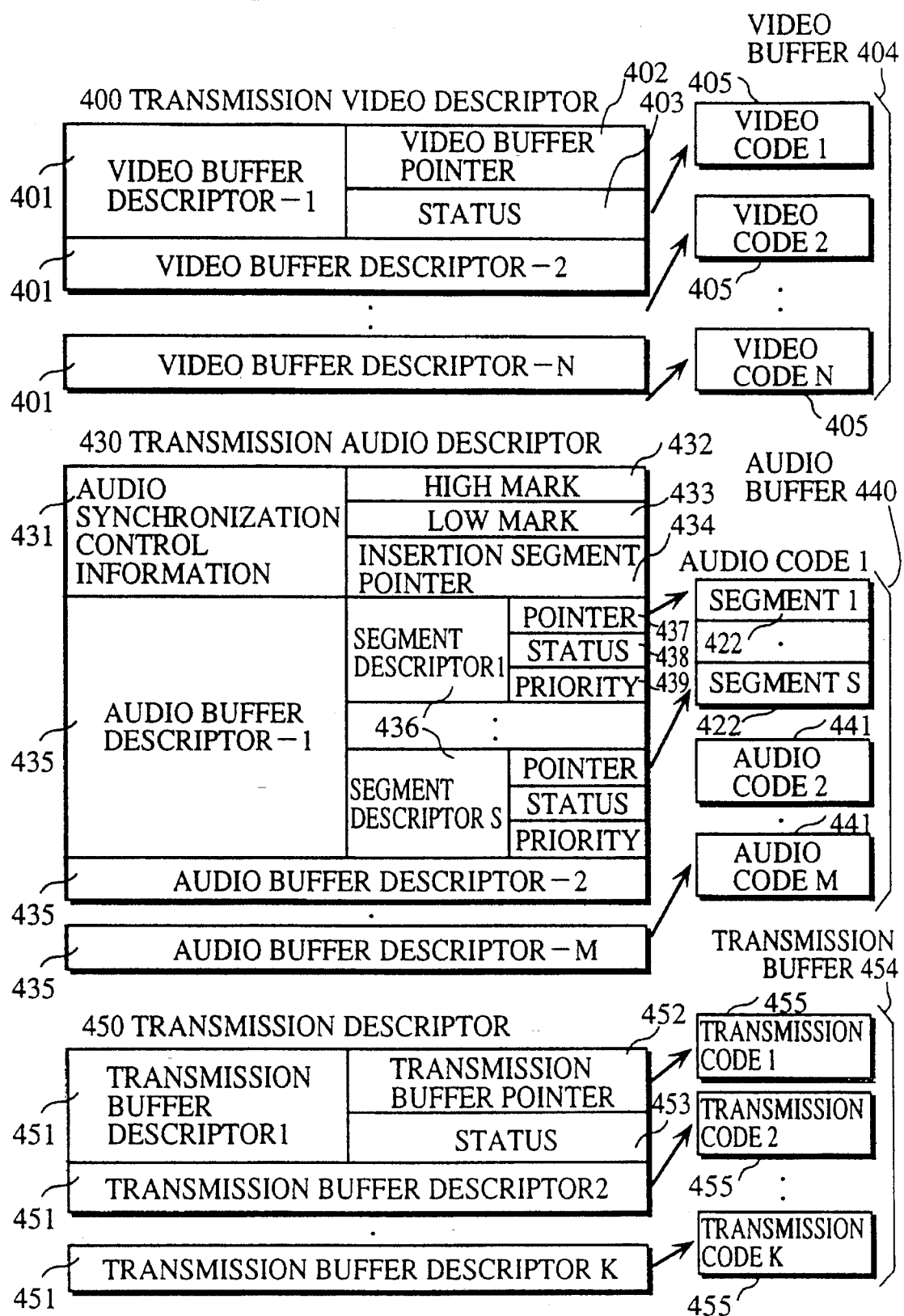
FIG. 4 is a figure showing the data format of the control information stored by the transmission video descriptor 400, the transmission audio descriptor 430, and the transmission descriptor 450.

FIG. 4 is a figure showing the data construction of the control information stored by the transmission video descriptor 400, the transmission audio descriptor 430, and the transmission descriptor 450.

The transmission video descriptor 400 is a storage area provided in the memory 112 and stores N video buffer descriptors 401.

The N video buffer descriptors 401 are the control information for allowing the CPU 111 to control the N pieces of video code 405 by queuing in the transmission video buffer 404, and are each made up of a video buffer pointer 402 and a status 403.

The video buffer pointer 402 shows the address in the transmission video buffer 404 where the video code 405 corresponding to each video buffer descriptor 401 is stored.

The status 403 shows whether video code 405 for transmission is present at the address shown by the video buffer pointer 402.

The transmission video buffer 404 is a storage area provided in the memory 112 as the working storage for the CPU 111 to generate the AV multiframes using the synchronization slip control software 211 and the multiplexer/separator software 212, and stores N pieces of video code 405 for transmission.

The video code 405 is the actual video code of variable length which is encoded by the video codec circuit 134.

The transmission audio descriptor 430 is a storage area provided in the memory 112 and stores the audio synchronization control information 431 and M audio buffer descriptors 435.

The audio synchronization control information 431 is the control information for compensating for the effects on audio reproduction caused by synchronization slips, and is made up of a high mark 432, a low mark 433 and an insertion segment pointer 434.

The high mark 432 shows the predetermined upper limit for use of the transmission audio buffer 440, which is for overseeing the actual used amount of the transmission audio buffer 440 during transmission. For example, when the transmission audio buffer 440 is capable of storing 8 pieces of audio code 441, and an upper limit for the storage of audio code 441 is set as 5 pieces, then the high mark 432 shows [5].

The low mark 433 shows the predetermined lower limit for use of the transmission audio buffer 440, which is for overseeing the actual used amount of the transmission audio buffer 440 during transmission. For example, when the transmission audio buffer 440 is capable of storing 8 pieces of audio code 441, and a lower limit for the storage of audio code 441 is set as 1 piece, then the low mark 433 shows [1].

The insertion segment pointer 434 shows the segment number of the audio code segment 442 for which insertion is to be performed, when the CPU 111 detects a shortage of audio data due to a synchronization slip and so determines insertion into an audio code segment 442 is to be performed. Audio code segments 442 whose segment numbers are set as the insertion segment pointer 434 are sent twice to the to the transmission buffer 454. Alternatively, the CPU 111, may calculate the average of the audio sample values included in the audio code segment 442 whose segment number is stored in the insertion segment pointer 434 and the audio code queued so as to follow after the audio code whose segment number is stored in the insertion segment pointer 434, and then generate a new audio code segment 442 whose audio sample is set at this average value, with this audio code segment 442 then being sent following the audio code segment 442 whose segment number is stored in the insertion segment pointer 434 to the transmission buffer 454.

The M audio buffer descriptors 435 are the control information for allowing the CPU 111 to control the M pieces of audio code 441 each made up of S audio code segments 442 in the transmission audio buffer 440, and are each made up of S segment descriptors 436.

The segment descriptors 436 are the control information obtained by dividing the audio code 441 in segments for allowing management in terms of units of one audio code segment 442, and are each made up of an audio buffer pointer 437, a status 438 and a priority 439.

The audio buffer pointer 437 shows the address of the segment in the transmission audio buffer 440 which stores the audio code segment 442 corresponding to the segment descriptor 436 in question.

The status 438 stores for the segment indicated by the audio buffer pointer 437 one of the following three possible statuses: "Corresponding audio code segment 442 present", "No corresponding audio code segment 442 present", or "Corresponding audio code segment 442 present, but invalid".

The priority 439 shows the sum of the squares of the audio sample values including in the corresponding audio code segment 442. This shows the amount of sound energy present in the corresponding audio code segment 442.

The transmission audio buffer 440, in the same way as the transmission video buffer 404, is a storage area provided in the memory 112 as the working storage for the CPU 111 to generate the AV multiframes, and stores the audio code 441 in units of one segment.

The audio code 441 is the encoded actual audio code, and is made up of S audio code segments 442. More specifically, the audio code 441, if, for example, made up of 80 bytes of audio code, will be divided into 8 audio code segments 442, each being of 10 bytes long.

The audio code segments 442 are the segments of audio code created by dividing the audio code 441.

The transmission descriptor 450 is a storage area provided in the memory 112 and stores K transmission buffer descriptors 451.

The transmission buffer descriptors 451 are the control information for allowing the CPU 111 to manage of K pieces of transmission code 455 by queuing them, and are each made up of a transmission buffer pointer 452 and a status 453.

The transmission buffer pointer 452 shows an address in the transmission buffer 454 at which the corresponding transmission code 455 is stored.

The status 453 shows whether there is corresponding transmission code 455 stored at the address in the transmission buffer 454 shown by the transmission buffer pointer 452.

The transmission buffer 454 stores the AV multiframes for transmission made up of the K pieces of transmission code 455 which are created by the multiplex conversion of the audio code, the video code and data. The stored K pieces of transmission code 455 are queued for transmission and then sent to the network control unit 220.

Figure 5:
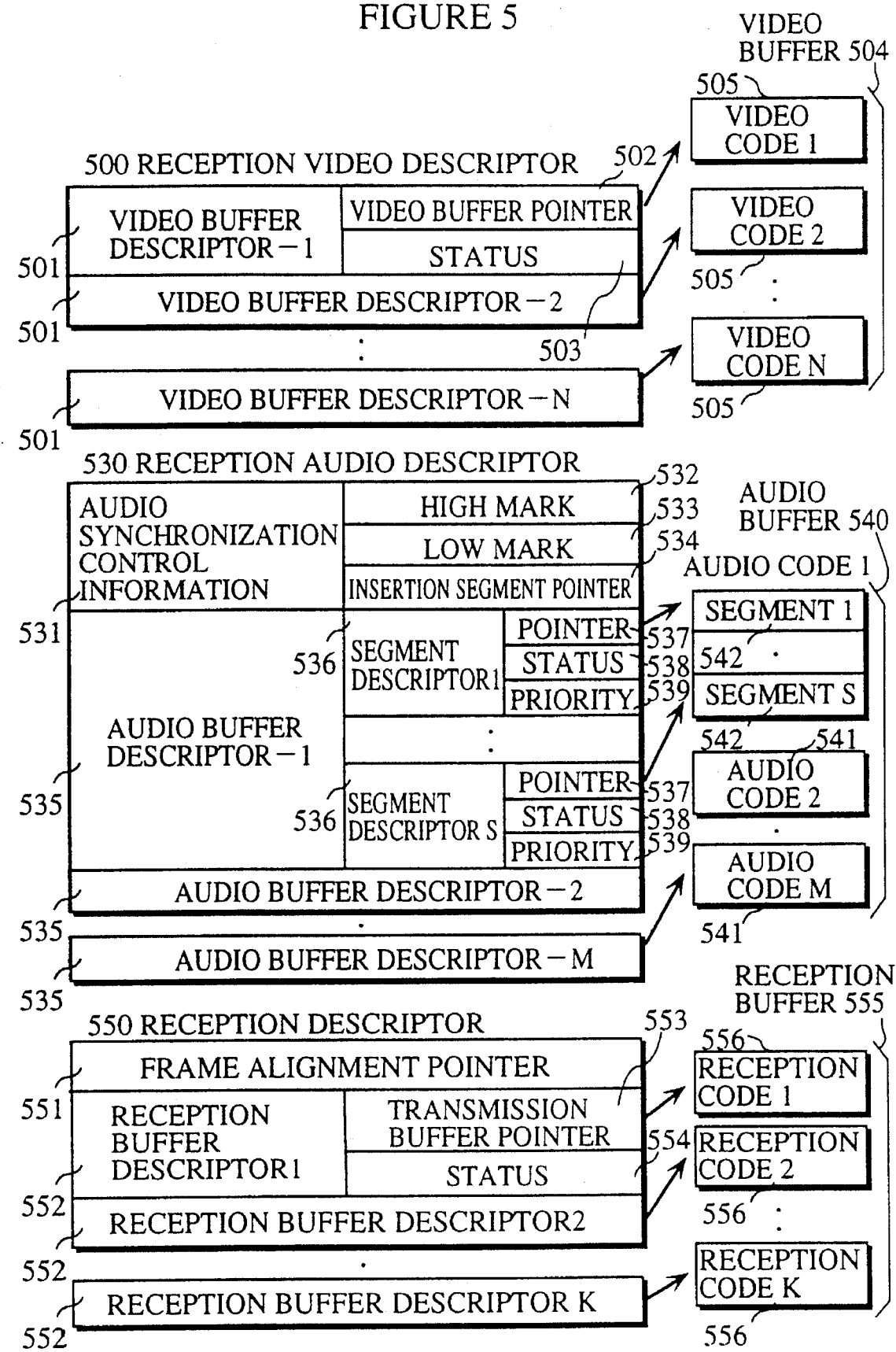
FIG. 5 is a figure showing the data format of the control information stored by the reception video descriptor 500, the reception audio descriptor 530, and the reception descriptor 550.

FIG. 5 is a figure showing the data construction of the control information stored by the reception video descriptor 500, the reception audio descriptor 530, and the reception descriptor 550.

The reception video descriptor 500 is a storage area provided in the memory 112 and stores N video buffer descriptors 501.

The N video buffer descriptors 501 are the control information for allowing the queuing in the reception video buffer 504 of the video code 505 separated from the received AV multiframes, and are each made up of a video buffer pointer 502 and a status 503.

The video buffer pointer 502 shows the address in the reception video buffer 504 where the video code 505 corresponding to each video buffer descriptor 501 is stored.

The status 503 shows whether received video code 505 is present at the address shown by the video buffer pointer 502.

The reception video buffer 504 stores N pieces of received video code 505 separated from the received AV multiframes.

The video code 505 is the actual video code for reproduction which is separated from the received AV multiframes by means of the CPU 111 executing the multiplexer/separator software 212.

The reception audio descriptor 530 stores the audio synchronization, control information 531 and M audio buffer descriptors 535.

The audio synchronization control information 531 is the control information for compensating for the effects on audio reproduction caused by synchronization slips, and is made up of a high mark 532, a low mark 533 and an insertion segment pointer 534.

The high mark 532 shows the predetermined upper limit for use of the reception audio buffer 540, which is for overseeing the actual used amount of the reception audio buffer 540 during reception. For example, when the reception audio buffer 540 is capable of storing 8 pieces of audio code 541, and an upper limit for the storage of audio code 541 is set as 5 pieces, then the high mark 532 shows [5].

The low mark 533 shows the predetermined lower limit for use of the reception audio buffer 540, which is for overseeing the actual used amount of the reception audio buffer 540 during reception. For example, when the reception audio buffer 540 is capable of storing 8 pieces of audio code 541, and a lower limit for the storage of audio information 541 is set as 1 piece, then the low mark 533 shows [1].

The insertion segment pointer 534 shows the segment number of the audio code segment 542 for which insertion is to be performed, when the CPU 111 detects a shortage of audio data due to a synchronization slip and so determines insertion into an audio code segment 542 is to be performed. Audio code segments 542 whose segment numbers are set as the insertion segment pointer 534 are sent twice to the to the audio codec circuit 143. Alternatively, the CPU 111, may calculate the average of the audio sample values included in the audio code segment 542 whose segment number is stored in the insertion segment pointer 534 and the audio code segment 542 queued so as to follow after the audio, code whose segment number is stored in the insertion segment pointer 534, and then generate a new audio code segment 542 whose audio sample is set at this average value, with this audio code segment 542 then being sent following the audio code segment 542 whose segment number is stored in the insertion segment pointer 534 to the audio codec circuit 143.

The M audio buffer descriptors 535 are the control information for allowing the CPU 111 to control the M pieces of audio code 541 each made up of S audio code segments 542 in the reception audio buffer 540, and are each made up of S segment descriptors 536.

The segment descriptors 536 are the control information obtained by dividing the audio code 541 in segments for allowing management in terms of units of one audio code segment 542, and are each made up of an audio buffer pointer 537, a status 538 and a priority 539.

The audio buffer pointer 537 shows the address of the segment in the reception audio buffer 540 which stores the audio code segment 542 corresponding to the segment descriptor 536 in question.

The status 538 stores for the segment in the reception audio buffer 540 indicated by the audio buffer pointer 537 one of the following three possible statuses: "Corresponding audio code segment 542 present", "No corresponding audio code segment 542 present", or "Corresponding audio code segment 542 present, but invalid".

The priority 539 shows the sum of the squares of the audio sample values including in the corresponding audio code segment 542. This shows the amount of sound energy present in the corresponding audio code segment 542.

The reception audio buffer 540 stores the M pieces of audio code 541 separated from the received AV multiframes.

The audio code 541 is the actual audio code separated from the received AV multiframes, and is made up of S audio code segments 542. More specifically, the audio code 541, if for example made up of 80 bytes of audio code, will be divided into 8 audio code segments 542, each being of 10 bytes long.

The audio code segments 542 are the segments of audio code created by dividing the audio code 541.

The reception descriptor 550 is a storage area provided in the memory 112 and stores the frame alignment pointer 551 and K reception buffer descriptors 552.

The frame alignment pointer 551 shows the address in the reception buffer 555 shown in the frame alignment signal FAS.

The reception buffer descriptors 552 are the control information for allowing the management by queuing of K pieces of reception code 556 inputted as AV multiframes from the network control unit 220, and are each made up of a reception buffer pointer 553 and a status 554.

The reception buffer pointer 553 shows an address in the reception buffer 555 at which the corresponding reception code 556 is stored.

The status 554 shows whether there is corresponding reception code 556 stored at the address in the reception buffer 555 shown by the reception buffer pointer 553.

The reception buffer 555 stores the AV multiframes inputted from the network control unit 220 made up of the K pieces of reception code 556.

The reception code 556 is the AV multiframes received from the network control unit 220.

Figure 6:
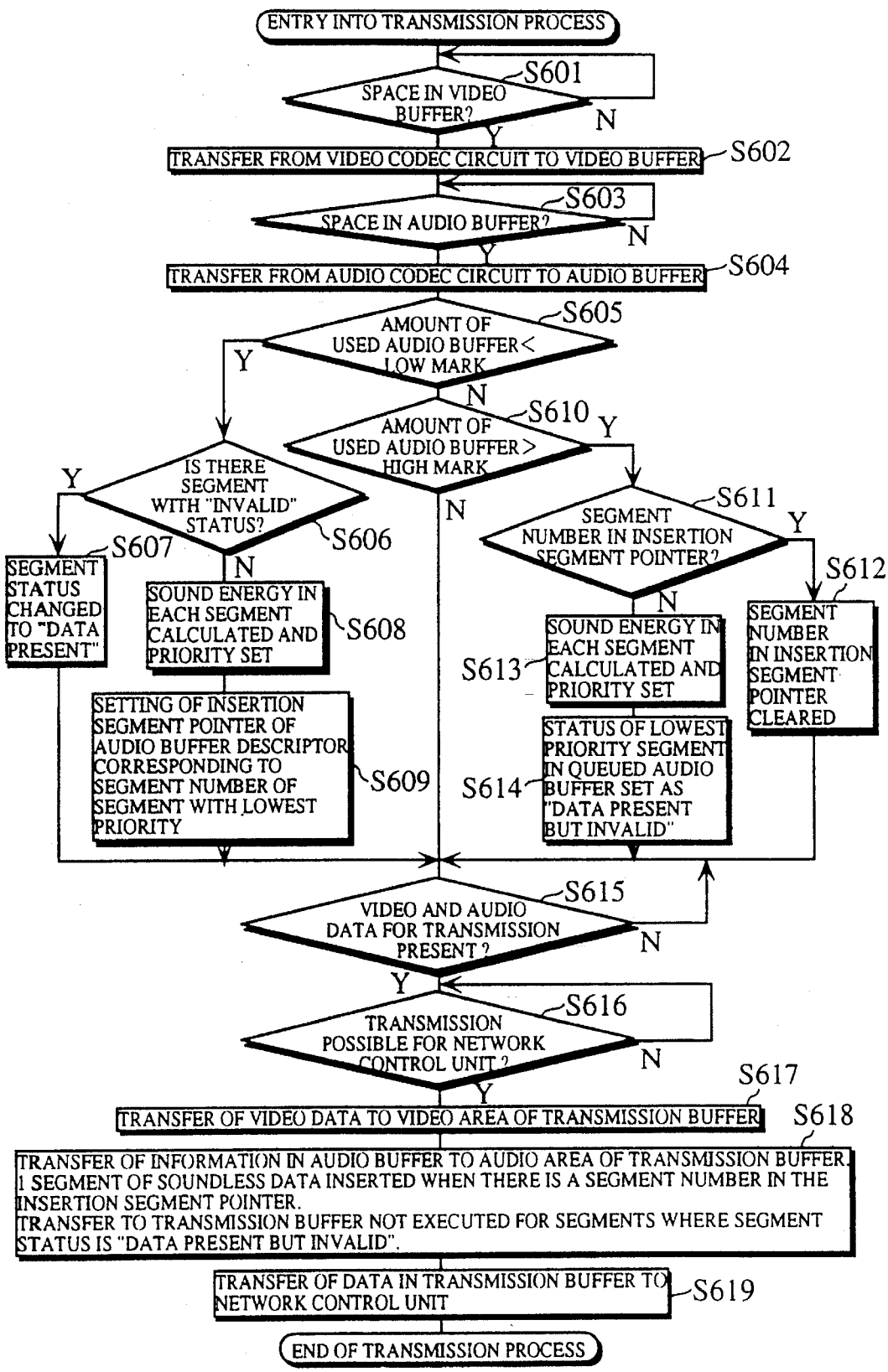
FIG. 6 is a flowchart for the process of the generation and transmission of AV multiframes by the PC-based teleconference terminal 200 of the present embodiment.

FIG. 6 is a flowchart for the process of the generation and transmission of AV multiframes by the PC-based teleconference terminal 200 of the present embodiment. The process described below is performed by the CPU 111 executing the synchronization slip control software 211 and the multiplexer/separator software 212.

The CPU 111 receives an input ISDN number, indicating a teleconference terminal which is to be accessed, from a keyboard or suchlike (not illustrated) which is connected to the computer bus 114, and, by using the D channel on the ISDN line, establishes a connection with the accessed terminal via the line switching connection processing unit 121. Having established the connection, the PC 110 executes the processes described below using one or a number of B channels, with video code, audio code, and data being transmitted and received in the AV multiframe format shown in FIG. 3. The transmitting and receiving of video code, audio code, and data between the CPU 111 and the ISDN line interface unit 122 is executed transparently via the line switching transparent data processing unit 221 and the computer bus 114.

In the video codec unit 130, the video signal from the camera 151 is AD converted by the A/D convertor 132, with the AD converted video signal then being compressed and encoded by the video codec circuit 134, thereby generating the video code 405. Having waited until space for storing the video code 405 in the transmission video buffer 404 is available (S601), the CPU 111 has the video code 405 sent via the computer bus 114 to the memory 112 where it is queued in the transmission video buffer 404 as shown in FIG. 4 (S602).

In the same way, in the audio codec unit 240 the audio signal from the microphone 152 is AD converted by the A/D convertor 142, with the AD converted audio signal then being compressed and encoded by the audio codec circuit 143, thereby generating the audio code segments 442. Having waited until space for storing the audio code segments 442 in the transmission audio buffer 440 is available (S603), the CPU ill has the audio code segments 442 sent via the computer bus 114 to the memory 112 where they are queued in the transmission audio buffer 440 as shown in FIG. 4 (S604). In doing so, when a fixed amount of video code 405 and audio code 441 are queued in the transmission video buffer 404 and the transmission audio buffer 440 for the first time, the process described below is executed.

The CPU 111, in order to compensate for any difference between the transfer rate of the ISDN line and the transfer rate from the audio codec unit 240, executes the process described below by executing the synchronization slip control software 211 for the audio code 441.

The CPU 111 refers to the low mark 433 stored in the transmission audio descriptor 430 and if the amount of audio code 441 queued in the transmission audio buffer 440 is less than the low mark 433 which is the lower limit for use of the transmission audio buffer 440 (S605), then it investigates whether there is a status 438 which is "Audio code segment 442 present in transmission audio buffer 440, but invalid" (S606). If there is such a status 438, then it is changed to "Audio code segment 442 present in transmission audio buffer 440", and the process advances to S615 (S607).

If, in S606, there is no status 438 which is "Audio code segment 442 present in transmission audio buffer 440, but invalid", then the CPU 111 calculates the sound energy in each audio code segment 442 of the queued audio code 441, and, in addition to setting the priority 439 in the corresponding segment descriptor 436 (S608), sets the segment number of the audio code segment 442 with the lowest priority 439, out of all of the audio code segments 442 queued in the transmission audio buffer 440, in the insertion segment pointer 434, before moving on to S615 (S609).

In S605, if the amount of audio code 441 queued in the transmission audio buffer 440 is above the low mark 433, then the CPU 111 refers to the high mark 432, and investigates whether the amount of audio code 441 queued in the transmission audio buffer 440 is more than the high mark 432 which is the upper limit for use of the transmission audio buffer 440 (S610). If it is more than the high mark 432, then the CPU 111 investigates whether there is a segment number set in the insertion segment pointer 434 (S611), clearing such numbers if present, before moving on to S615 (S612).

If in S611 there is no segment number set in the insertion segment pointer 434, then the CPU 111 calculates the sound energy in each audio code segment 442 of the queued audio code 441, and, in addition to setting the priority 439 in the corresponding segment descriptor 436 (S613), sets the status 438 in the segment descriptor 436 corresponding to the audio code segment 442 with the lowest priority 439, out of all of the audio code segments 442 queued in the transmission audio buffer 440, as "Corresponding audio code segment 442 present, but invalid" (S614).

The CPU 111 then waits until the video code 405 and the audio code 441 have been queued in the transmission video buffer 404 and in the transmission audio buffer 440 in the memory 112 (S615), before waiting until transmission to the network control unit 220 becomes possible (S616), and, when transmission to the network control unit 220 becomes possible, it transmits the video code 405 from the transmission video buffer 404 to the video area of the transmission buffer 454 (S617).

The CPU 111 then transfers the audio code segments 442 in the transmission audio buffer 440 to the audio area of the AV multiframes, shown in FIG. 3, in the transmission buffer 454, and generates the AV multiframes, at the same time queuing them temporarily in the transmission buffer 454. At this point, the CPU 111 arranges the audio code 441 so as to be delayed, for example, by about 10 msec, with respect to the video code 405 in the AV multiframes as a lip-synch process (the synchronization of audio and video to be reproduced). This is because the coding rate of the video codec circuit 134 is slower than the coding rate of the audio codec circuit 143, for example, by about 10 msec per AV multiframe.

In the same way, when the segment number of the audio code segment 442 to be transmitted is written in the insertion segment pointer 434, the CPU 111 transfers such an audio code segment 442 2 times consecutively to the transmission buffer 454, with the insertion segment pointer 434 in question being cleared once the second transfer of the audio code segment 442 has been completed. Alternatively, the CPU 111, may calculate the average of the audio sample values included in the audio code segment 442 whose segment number is stored in the insertion segment pointer 434 and the audio code queued so as to follow after the audio code whose segment number is stored in the insertion segment pointer 434, and then generate a new audio code segment 442 whose audio sample is set at this average value, with this audio code segment 442 then being sent following the audio code segment 442 whose segment number is stored in the insertion segment pointer 434 to the transmission buffer 454. On such an occasion, then once the transmission of the new audio code segment 442 is complete, then the corresponding insertion segment pointer 434 is cleared.

Additionally, if at this point the status 438 of the audio code segment 442 to be transferred is "Audio code segment 442 present in transmission audio buffer 440, but invalid", then such an audio code segment 442 is not transferred to the transmission buffer 454 and is discarded. Alternatively, the CPU 111, may calculate the average of the audio sample values included in the audio code segments 442 which precede and follow the audio code segment 442 whose status 438 is "Audio code segment 442 present in transmission audio buffer 440, but invalid", and then generate a new audio code segment 442 whose audio sample is set at this average value, with this generated audio code segment 442 then being transferred to the transmission buffer 454 in place of the audio code segment 442 queued so as to follow the audio code segment 442 whose status 438 is "Audio code segment 442 present in transmission audio buffer 440, but invalid", and the audio code segment 442 whose status 438 is "Audio code segment 442 present in transmission audio buffer 440, but invalid" and the following audio code segment 442 being discarded.

The CPU 111 transfers or discards each of the audio code segments 442 to the audio code segment 442 and updates the corresponding segment descriptors 436 (S618).

The CPU 111 then forms the AV multiframes in the transmission buffer 454 and, having queued the transmission code 455, transfers it consecutively to the network control unit 220 (S619), with the network control unit 220 sending these AV multiframes out on one B channel or a number of B channels on the ISDN line.

The process shown as S601 through S619 is then repeated for the generation of each piece of video code 405 and each audio code segment 442 by the video codec circuit 134 and the audio codec circuit 143.

Figure 7:
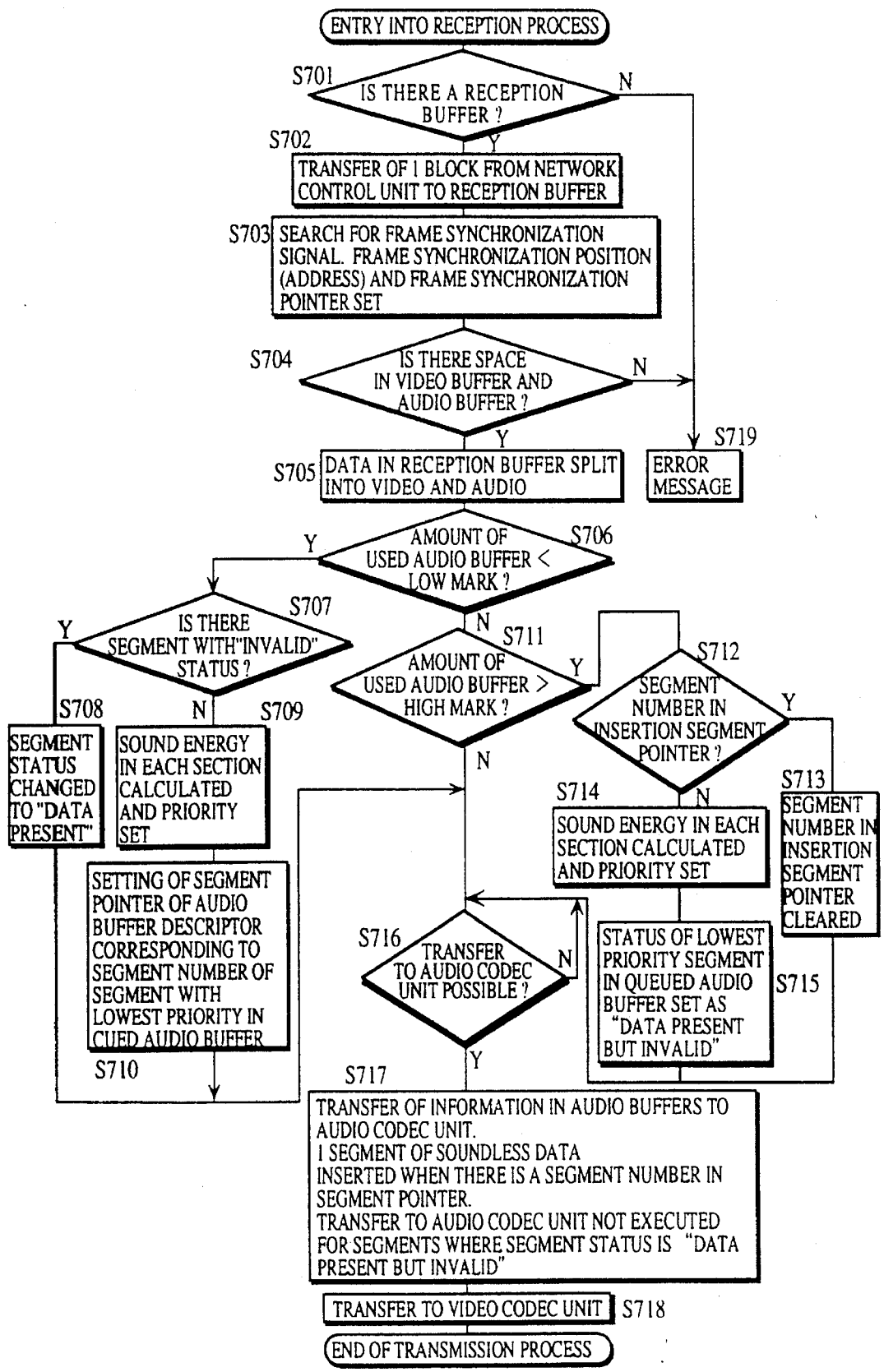
FIG. 7 is a flowchart for the process of the reception and separation of AV multiframes by the PC-based teleconference terminal 200 of the present embodiment.

FIG. 7 is a flowchart for the process of the reception and separation of AV multiframes by the PC-based teleconference terminal 200 of the present embodiment. The following process is performed, in the same way as with transmission, by having the CPU 111 execute the multiplexer/separator software 212 and the synchronization slip control software 211.

The CPU 111 first investigates whether there is an empty storage area in the reception buffer 555 (S701), and if there is, transfers the received AV multiframes via the line switching transparent data processing unit 221 to the memory 112. The received AV multiframes are then queued in their multiframe state in the reception buffer 555 shown in FIG. 5 in block units of a fixed length (S702).

By executing the multiplexer/separator software 212, the CPU 111 searches for the frame alignment signal (FAS) in the content of the reception buffer 555, and taking the frame alignment, stores it as the frame alignment pointer 551 in the reception descriptor 550, as well as separating the audio code 541, the video code 505, the data, and the bit-rate allocation signal (BAS) (S703).

The CPU 111 investigates whether there is an empty storage area in the reception video buffer 504 and in the reception audio buffer 540 (S704), and if there is, executes a lip-synch process, more specifically the delaying of the separated audio code 541 of about 10 msec with regard to the video code 505, and queues the video code 505 in the reception video buffer 504 and the audio code 541 in the reception audio buffer 540, respectively (S705).

It should be noted that the CPU 111 performs the following synchronization slip process in order to compensate for any difference in the reception rate from the ISDN line and the transfer rate to the audio codec unit 240 by executing the synchronization slip control software 211. The synchronization slip process S706 through S715 described below is executed according to the same process as for the process executed during the generation of AV multiframes S605 to S614.

The CPU 111 refers to the low mark 533 stored in the reception audio descriptor 540 and if the amount of audio code 541 queued in the reception audio buffer 540 is less than the low mark 533 (S706), then it investigates whether there is a status 538 which is "Audio code segment 542 present in reception audio buffer 540, but invalid" (S707). If there is such a status 538, then it is changed to "Audio code segment 542 present in reception audio buffer 540", and the process advances to S716 (S708).

If, in S707, there is no status 538 which is "Audio code segment 542 present in reception audio buffer 540, but invalid", then the CPU 111 calculates the sound energy in each audio code segment 542 queued in the reception audio buffer 540 in the same way as during transmission, and, in addition to setting the priority 539 in the corresponding segment descriptor 536 (S709), sets the segment number of the audio code segment 542 with the lowest priority 539, out of all of the audio code segments 542 queued in the transmission audio buffer 540, in the insertion segment pointer 534 in the reception audio descriptor 530, before moving on to S716 (S710).

In S706, if the Amount of audio code 541 queued in the reception audio buffer 540 is above the low mark 533 in the reception audio descriptor 530, then the CPU 111 refers to the high mark 532 in the reception audio descriptor 530, and investigates whether the amount of audio code 541 queued in the reception audio buffer 540 is more than the high mark 532 (S711). If it is more than the high mark 532, then the CPU 111 investigates whether there is a segment number set in the insertion segment pointer 534 (S712), clearing such numbers if present, before moving on to S716 (S713).

If in S712 there is no segment number set in the insertion segment pointer 534, then the CPU 111 calculates the sound energy in each queued audio code segment 542, and, in addition to setting the priority 539 (S714), sets the status 538 in the segment descriptor 536 corresponding to the audio code segment 542 with the lowest priority 539, out of all of the audio code segments 542 queued in the reception audio buffer 540, as "Corresponding audio code segment 542 present, but invalid" (S715).

The CPU 111 then waits until the audio codec unit 240 is able to receive the audio code segments 542 (S716) and transfers successively the audio code segments 542 to the audio codec unit 240, based on the contents of the reception audio descriptor 530 by executing the multiplexer/separator software 212. When transferring audio code segments 542 whose segment number is stored in the insertion segment pointer 534, the CPU 111 sends such audio code segments 542 consecutively twice. Alternatively, the CPU 111, may calculate the average of the audio sample values included in the audio code segment 542 whose segment number is stored in the insertion segment pointer 534 and the audio code segment 542 queued so as to follow after the audio code segment 542 whose segment number is stored in the insertion segment pointer 534, and then generate a new audio code segment 542 whose audio sample is set at this average value, with this new audio code segment 542 then being sent following the audio code segment 542 whose segment number is stored in the insertion segment pointer 542 to the audio codec circuit 143.

In the same way, when the status 538 of the audio code segment 542 is "Corresponding audio code segment 542 present, but invalid", then the CPU 111 does not transfer the audio code segment 542 in question. Alternatively, the CPU 111, may calculate the average of the audio sample values included in the audio code segments 542 which precede and follow the audio code segment 542 whose status 538 is "Audio code segment 542 present in transmission audio buffer 540, but invalid" and the audio code segment 542 queued so as to follow after such an audio code segment 542, and then generate a new audio code segment 542 whose audio sample is set at this average value, with this generated audio code segment 542 then being sent to the audio codec circuit 143 in place of the audio code segment 542 queued so as to follow the audio code segment 542 for which the status 539 is "Audio code segment 542 present in transmission audio buffer 540, but invalid", and the audio code segment 542 whose status 538 is "Audio code segment 542 present in transmission audio buffer 540, but invalid" and the following audio code segment 542 then being discarded. In the same way, the CPU 111, on transferring each audio code segment 542 in the reception audio buffer 540, updates the corresponding segment descriptor 536 and the insertion segment pointer 534 (S717).

The CPU 111 then transfers the video code 505 queued in the reception video buffer 504 to the video codec unit 130 (S718).

In the same way, if in S710 or in S704 there is no empty storage area in any of the buffers out of the reception buffer 555, the reception video buffer 504 and the reception audio buffer 540, then the CPU 111 judges that the video codec circuit 134 or the audio codec circuit 143 is stopped, and, in addition to displaying an error message on the display unit 150, notifies the other terminals with whom transmission is being performed of the occurrence of the error before terminating its processing (S719).

After the above process has been performed, in the video codec unit 130 the video code 505 is decoded, DA converted by the D/A convertor 131, and then displayed by the display unit 150 having been superimposed over the computer screen by the display control unit 113. In the audio codec unit 240, the audio code 541 is decoded, DA converted by the D/A convertor 141, and then reproduced by the speaker 153. The process form S701 through S719 is then repeated for the next reception of AV multiframes by the network control unit 220.

In the way described above, by means of the present embodiment, since the PC 110, the video codec unit 130, the network control unit 220 and the audio codec unit 240 can transfer data including audio code and video code between themselves via the computer bus 114, then the PC-based teleconference terminal 200 can make effective use of the hardware and software resources in the PC 110, and the processing for which the PC-based teleconference terminal 100 needed a specialized LSI circuit can be executed by the CPU 111.

That is to say, for the PC-based teleconference terminal 200, the multiplex conversion and separation of video code and audio code can be performed by the CPU 111 by executing the multiplexer/separator software 212. The effects on audio reproduction caused by synchronization slips can also be prevented by the CPU 111 executing the synchronization slip control software 211. Also, since for the PC-based teleconference terminal 200, the PC 110, the video codec unit 130, the network control unit 220 and the audio codec unit 240 can transfer data including audio code and video code between themselves via the computer bus 114, then the CPU 111 in this embodiment can further partly take over the processing such as the generation and decoding of video code and the generation and decoding of audio code executed by the video codec circuit 134 and the audio codec circuit 143. In addition, it is possible for the CPU 111 to execute a variety of processes on the video and audio signals, such as executing audio recognition and displaying the received audio data as subtitles for the hard of hearing.

It should be noted that in this embodiment, the priority 439 has been described as being the sum of the squares of the all of audio samples included in the corresponding audio code segments 442, but this priority 439 need not be calculated in such a way. For example, when the audio codec circuit 143 is using PCM (pulse code modulation) for the G.711 recommendation on the CCITT, it is possible for the priority to be calculated as the sum of the squares of the values of the audio samples, or as the average of the squares of the audio sample values. When the audio codec circuit 143 is using ADPCM (adapted differential pulse code modulation) for the G.726 recommendation on the CCITT, it is also possible for the calculation to be for the sum of the differential values under ADPCM of all of the corresponding audio code segments 442, or for the sum of the squares of the differential values under ADPCM. In the same way, the priorities 539 for the audio code segments 542 may be calculated in the same way.

Embodiment 2

Figure 8:
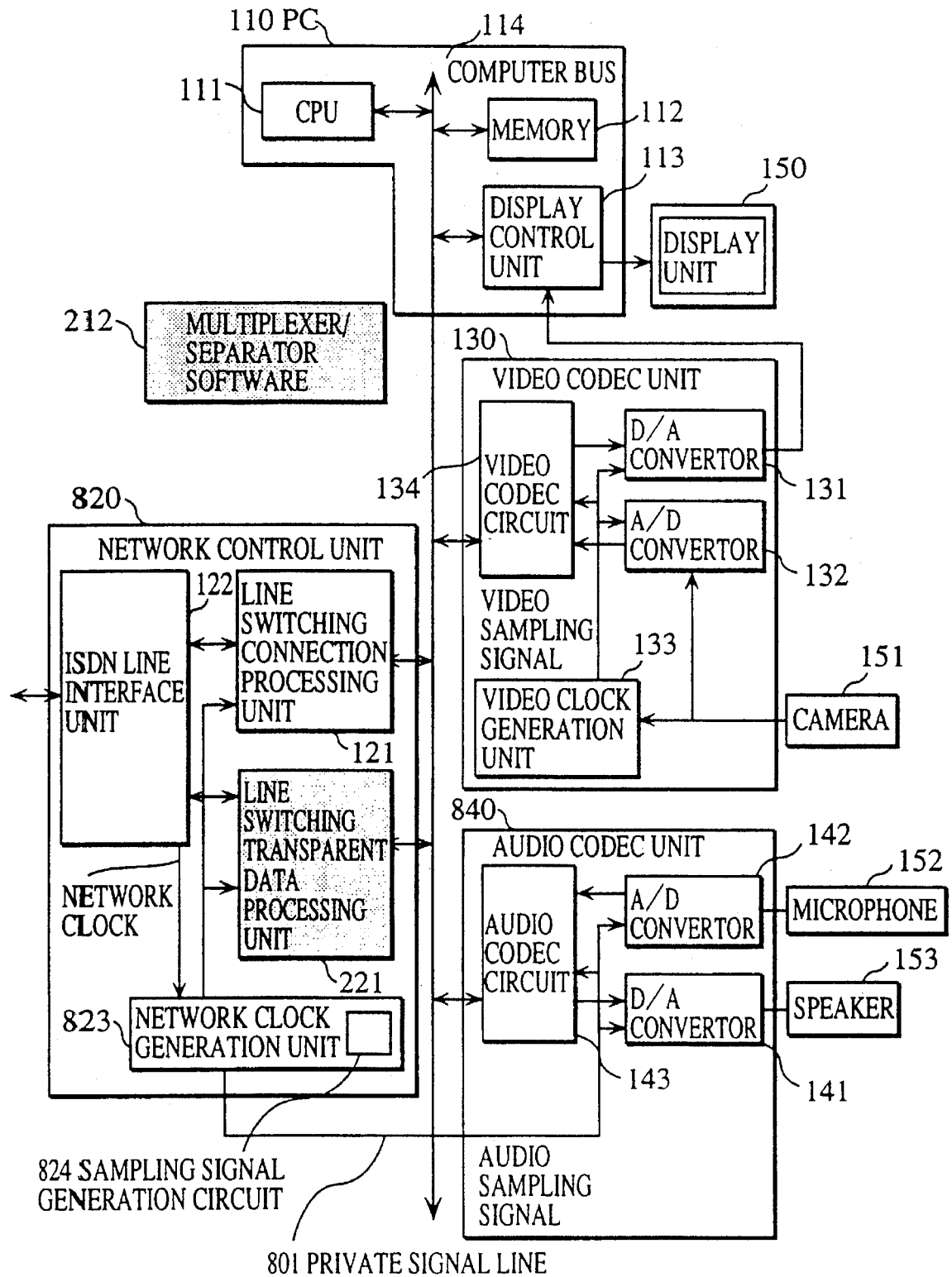
FIG. 8 is a block diagram showing the construction of the PC-based teleconference terminal 800 according to the second embodiment of the present invention.

FIG. 8 is a block diagram showing the construction of the PC-based teleconference terminal 800 according to the second embodiment of the present invention. The PC-based teleconference terminal 800 of the present embodiment is principally constructed of the same components as the PC-based teleconference terminal 200 shown in FIG. 2, so that such components have been given the same reference numerals, and their explanation has been omitted.

The PC-based teleconference terminal 800 is constructed from a PC 110, a video codec unit 130, a network control unit 820 and an audio codec unit 840. The PC 110, the video codec unit 130, and the audio codec unit 840 are all connected, in the same way as the PC-based teleconference terminal 200, to the display unit 150, the camera 151, the microphone 152 and the speaker 153. In this embodiment, the video codec unit 130, the network control unit 820 and the audio codec unit 840 are all constructed on the same board, which is then inserted into the expansion slot of the PC 110.

The network control unit 820 includes a line switching connection processing unit 121, an ISDN line interface unit 122, a network clock control unit 823 and a line switching transparent data processing unit 221. The network clock control unit 823 additionally includes a sampling signal generation circuit 824. The audio codec unit 840 includes a D/A convertor 141, an A/D convertor 142, and an audio codec circuit 143. The memory 112 stores the multiplexer/separator software 212.

The differences between the present embodiment and the PC-based teleconference terminal 200 of the first embodiment are the network control unit 820 and the audio codec unit 840. Since there is no wiring for transferring the clock signal and no connector or suchlike for connecting such a clock signal line on a ready-made expansion board, the network clock control unit 823 and the audio codec unit 840 are connected to each other by a connector in the form of the private signal line 801.

The sampling signal generation circuit 824 provides the ISDN network clock as the audio sampling signal to the D/A convertor 141, the A/D convertor 142, and the audio codec circuit 143 via the private signal line 801.

The audio code generated by the audio codec unit 840 is temporarily entered into the memory 112 via the computer bus 114, and is queued in the transmission audio buffer. In the same way transmission video code generated by the video codec unit 130 is queued in the transmission video buffer. AV multiframes are then composed in the transmission buffer from the video code queued in the transmission video buffer and the audio code queued in the transmission audio buffer, and queued, before being sent successively to the line switching transparent data processing unit 221. In this embodiment, however, since the audio sampling signal is synchronized to the ISDN network clock, synchronization slips do not occur. Therefore the transmission process differs to that of the first embodiment in that the synchronization slip control process shown as S605 to S614 in FIG. 6 is not performed.

In the same way as in the first embodiment, the AV multiframes received by the ISDN line interface unit 122 are queued in the reception buffer prepared in the memory 112 via the computer bus 114. Alignment is taken from the frame alignment signal (FAS) and the AV multiframes are separated into video code, audio code, data and the bit-rate allocation signal (BAS) with the received video code being queued in the reception video buffer and the received audio code being queued in the reception audio buffer. The video code queued in the reception video buffer is then sent successively to the video codec circuit 134, and having been decoded by the video codec circuit 134, is DA converted by the D/A convertor 131 and is displayed by the display control unit 113 on the display unit 150. The audio code queued in the reception audio buffer is then sent successively to the audio codec circuit 143, and, having been decoded by the audio codec circuit 143, is DA converted by the D/A convertor 141 and is then reproduced by the speaker 153. It should be noted that in this embodiment synchronization slips do not occur, so that in the same way as the transmission process, the synchronization slip control process of S706 through S715 of the first embodiment shown in FIG. 7 is not executed.

In the way described above, the present embodiment has the additional benefit of the avoidance of synchronization slips by having the network clock inputted as the audio sampling signal from the network clock control unit 823 via the private signal line.

Embodiment 3

Figure 9:
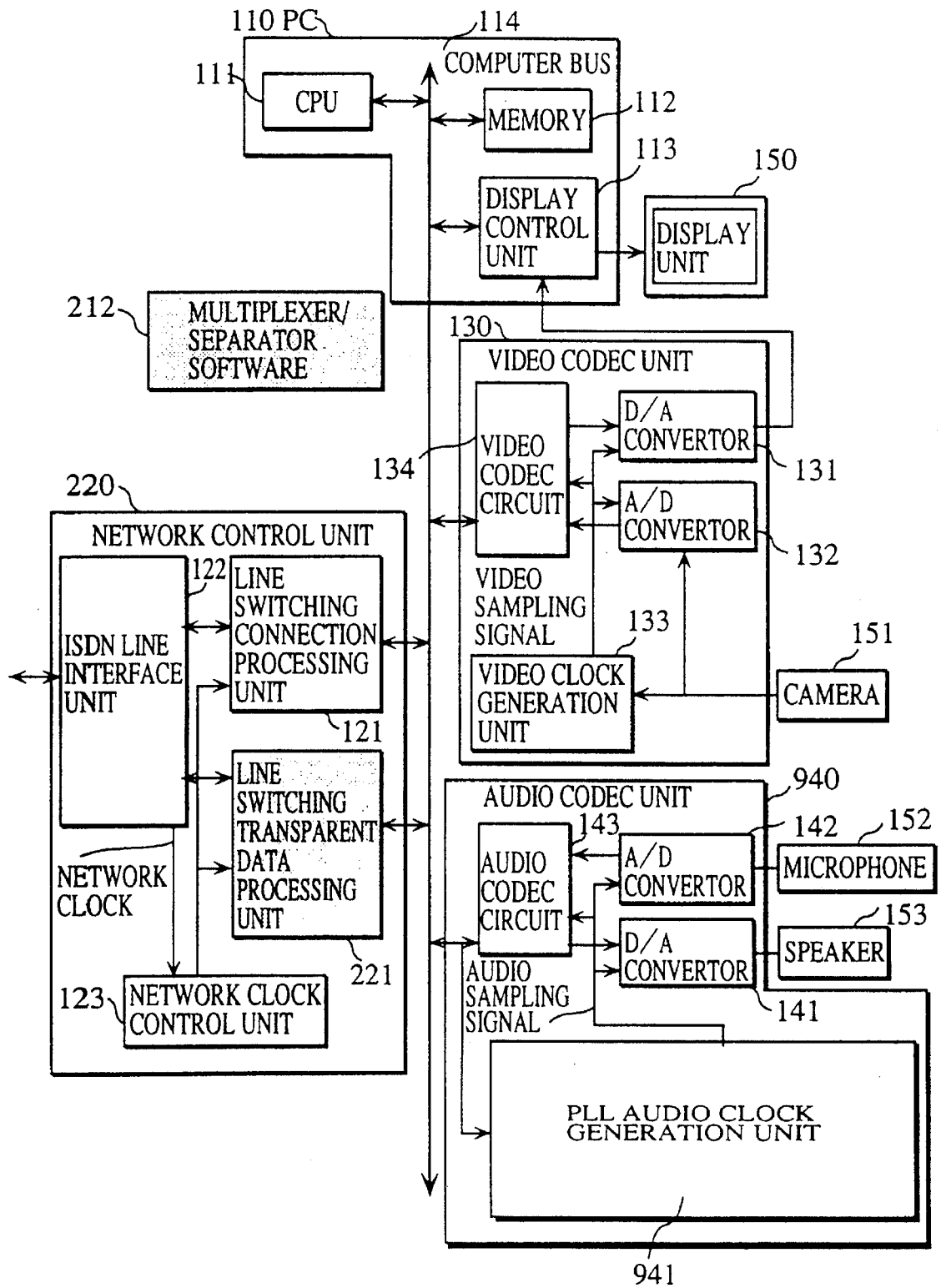
FIG. 9 is a block diagram showing the construction of the PC-based teleconference terminal 900 according to the third embodiment of the present invention.

FIG. 9 is a block diagram showing the construction of the PC-based teleconference terminal 900 according to the third embodiment of the present invention. The PC-based teleconference terminal 900 of the present embodiment is principally constructed of the same components as PC-based teleconference terminal 100, the PC-based teleconference terminal 200 and the PC-based teleconference terminal 800, so that such components have been given the same reference numerals, and their explanation has been omitted.

The PC-based teleconference terminal 900 is constructed from a PC 110, a video codec unit 130, a network control unit 220 and an audio codec unit 940. The PC 110, the video codec unit 130, and the audio codec unit 940 are all connected, in the same way as the PC-based teleconference terminal 200, to the display unit 150, the camera 151, the microphone 152 and the speaker 153. The memory 112 again stores the multiplexer/separator software 212.

The audio codec unit 940 includes a D/A convertor 141, an A/D convertor 142, an audio codec circuit 143 and a PLL audio clock generation unit 941.

Figure 10:
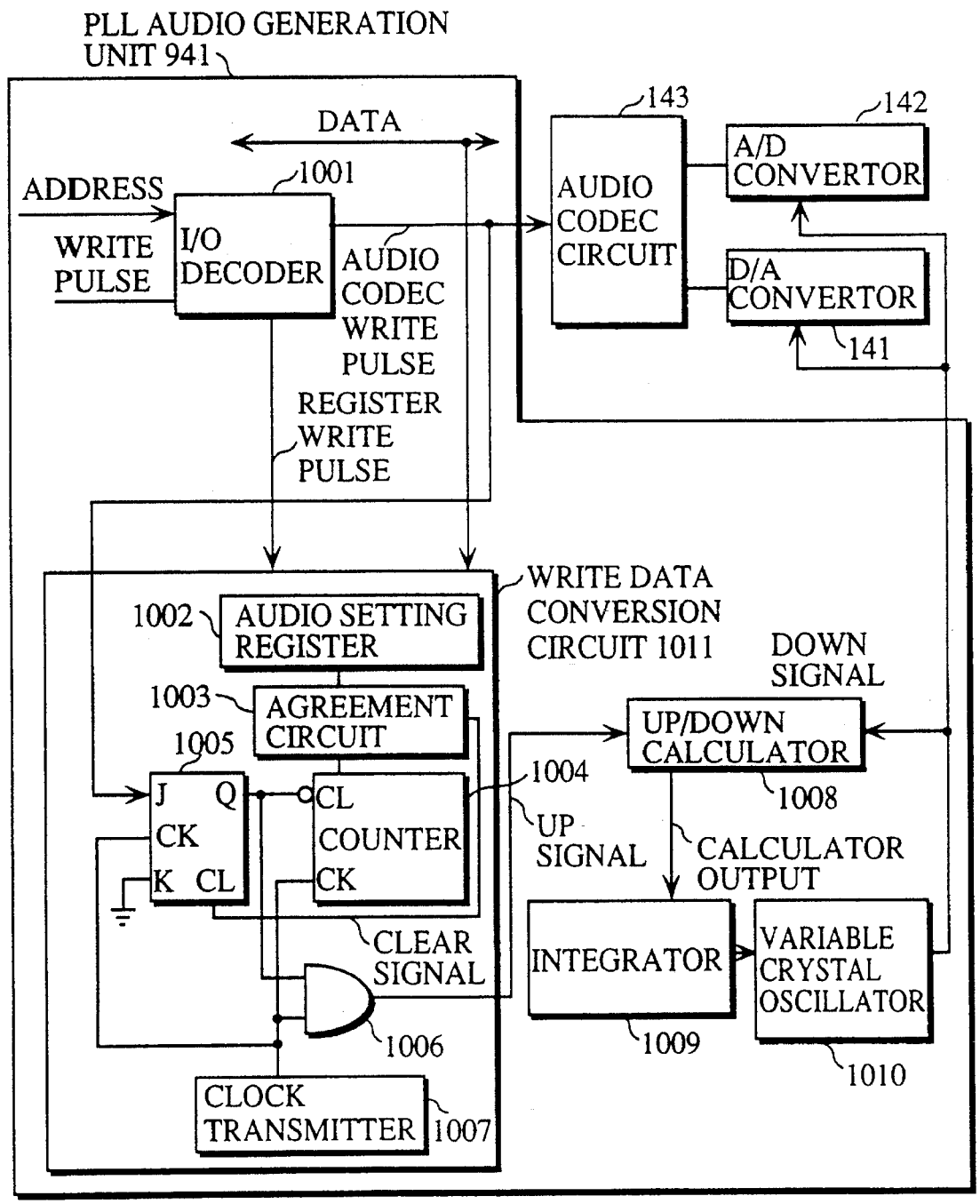
FIG. 10 is a block diagram showing the detailed construction of the PLL audio clock generation unit 941.

FIG. 10 is a block diagram showing the detailed construction of the PLL audio clock generation unit 941.

The PLL audio clock generation unit 941 is made up of an I/O decoder 1001, an updown calculator 1008, an integrator 1009, a variable crystal oscillator 1010 and a write data conversion circuit 1011. The write data conversion circuit 1011 is further comprised of an audio setting register 1002, an agreement circuit 1003, a counter 1004, a JK-FF circuit (flip-flop circuit) 1005, an AND gate 1006 and a clock transmitter 1007.

The I/O decoder 1001 decodes the device address which is the transfer address of the data input from the computer bus 114, and, if the input data is reception audio code to be written into the audio codec circuit 143, generates the register write pulse for the audio setting register 1002, as well as writing the audio pulse number included in a reception audio code at the start of said reception audio code into the audio setting register 1002. In addition, the I/O decoder 1001 generates the write pulse for the audio codec circuit 143, and writes said reception audio code into the audio codec circuit 143.

The write data conversion circuit 1011 generates a same number of pulses as the number of audio samples written into the audio setting register 1002.

The audio setting register 1002 stores the number of audio samples in the audio code written into the audio codec circuit 143 in one write operation.

The agreement circuit 1003 generates a clear signal for the JK-FF circuit 1005 when the number of audio samples stored by the audio setting register 1002 is equal to the count value of the counter 1004.

The counter 1004 is set to [1] when cleared and, while the output Q of the JK-FF circuit 1005 is [1], that is to say, while the clear signal is [0], counts the number of clock pulses from the clock transmitter 1007.

The JK-FF circuit 1005 has its K terminal earthed, and is set according to the write pulse for the audio codec circuit 143, and reset according to the clear signal from the agreement circuit 1003. It should be noted that the JK-FF circuit 1005 need not be composed of an JK-FF circuit, and may be composed of, for example, an RS-FF circuit, so long as it is set according to the write pulse for the audio codec circuit 143, and reset according to the clear signal from the agreement circuit 1003.

The AND gate 1006 outputs the up signal when there is a logical AND between the Q output from the JK-FF circuit 1005 and the clock pulse from the clock transmitter 1007.

The clock transmitter 1007 generates a clock signal of around 10 MHz and outputs this generated clock pulse to the JK-FF circuit 1005, the AND gate 1006 and the counter 1004.

The updown calculator 1008 outputs the difference between the up signal from the AND gate 1006 and the down signal which is the audio sampling signal from the variable crystal oscillator 1010 to the integrator 1009.

The integrator 1009 is constructed of a low-pass filter or suchlike, and smoothes the output of the updown calculator 1008, before outputting to the variable crystal oscillator 1010.

The variable crystal oscillator 1010 is one kind of voltage control oscillator (VCO) which can change its frequency in accordance with the output of the integrator 1009, and, in addition to outputting an audio sampling signal of a frequency of about 8 MHz to the updown calculator, outputs to the D/A convertor 141 and the A/D convertor 142.

In the manner described above, the updown calculator 1008, the integrator 1009, and the variable crystal oscillator 1010 form a phase lock loop (PLL). By doing so, the frequency of the audio sampling signal can be set equal to the average frequency of the number of audio samples written into the audio codec circuit 143, and, as a result, set equal to the network clock.

As described above, by means of the present embodiment, in addition to the effect of the second embodiment, an audio sampling signal synchronized to the network clock by the PLL audio clock generation unit 941 can be generated, so that synchronization slips can be avoided, but unlike the second embodiment, without providing a new terminal for connecting the private signal line 801, and without executing a complicated process for operating the private signal line 801, on an expansion board or a PC card.

Embodiment 4

Figure 11:
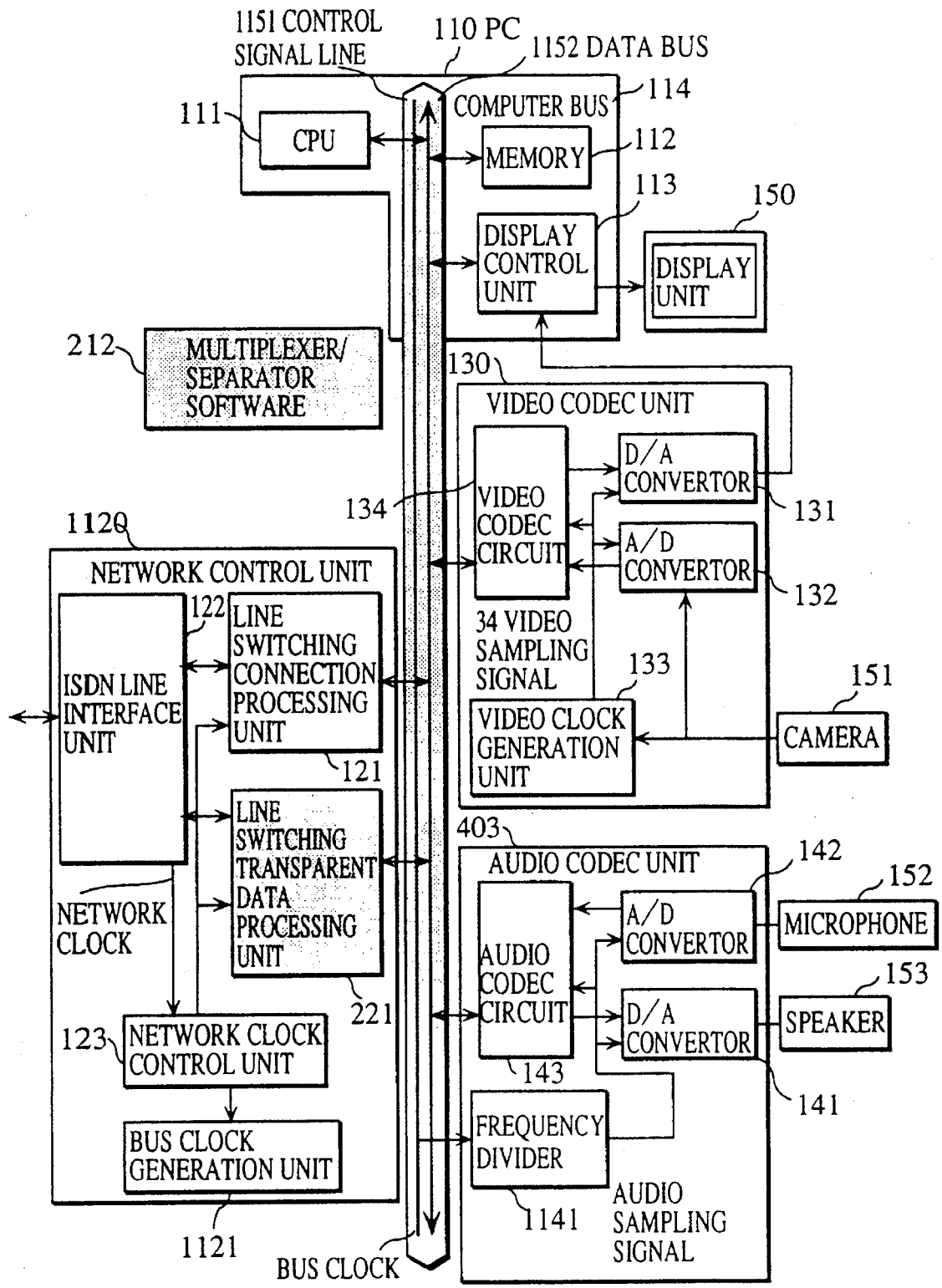
FIG. 11 is a block diagram showing the construction of the PC-based teleconference terminal 1100 according to the fourth embodiment of the present invention.

FIG. 11 is a block diagram showing the construction of the PC-based teleconference terminal 1100 according to the fourth embodiment of the present invention. The PC-based teleconference terminal 1100 of the present embodiment is principally constructed of the same components as PC-based teleconference terminal 100, and the PC-based teleconference terminal 200, so that such components have been given the same reference numerals, and their explanation has been omitted.

The PC-based teleconference terminal 1100 is constructed from a PC 110, a video codec unit 130, a network control unit 1120 and an audio codec unit 1140. The PC 110, the video codec unit 130, and the audio codec unit 1140 are all connected, in the same way as the PC-based teleconference terminal 200, to the display unit 150, the camera 151, the microphone 152 and the speaker 153. The memory 112 again stores the multiplexer/separator software 212.

The network control unit 1120 is made up of a line switching connection processing unit 121, an ISDN line interface unit 122, a network clock control unit 123, a line switching transparent data processing unit 221, and a bus clock generation unit 1121. The audio codec unit 1140 is made up of a D/A convertor 141, an A/D convertor 142, an audio codec circuit 143 and an audio clock generation unit 1141. The computer bus 114 is made up of a control signal line 1151 and a data bus 1152.

The bus clock generation unit 1121 multiplies the network clock from the network clock control unit 123, and so generates the bus clock for the computer bus 114.

The control signal line 1151 carries the control signals, such as the bus clock.

The data bus 1152 carries the audio code, the video code, and other kinds of data.

The audio clock generation unit 1141 divides the bus clock of the computer bus 114 and so generates the audio sampling signal.

Figure 12:
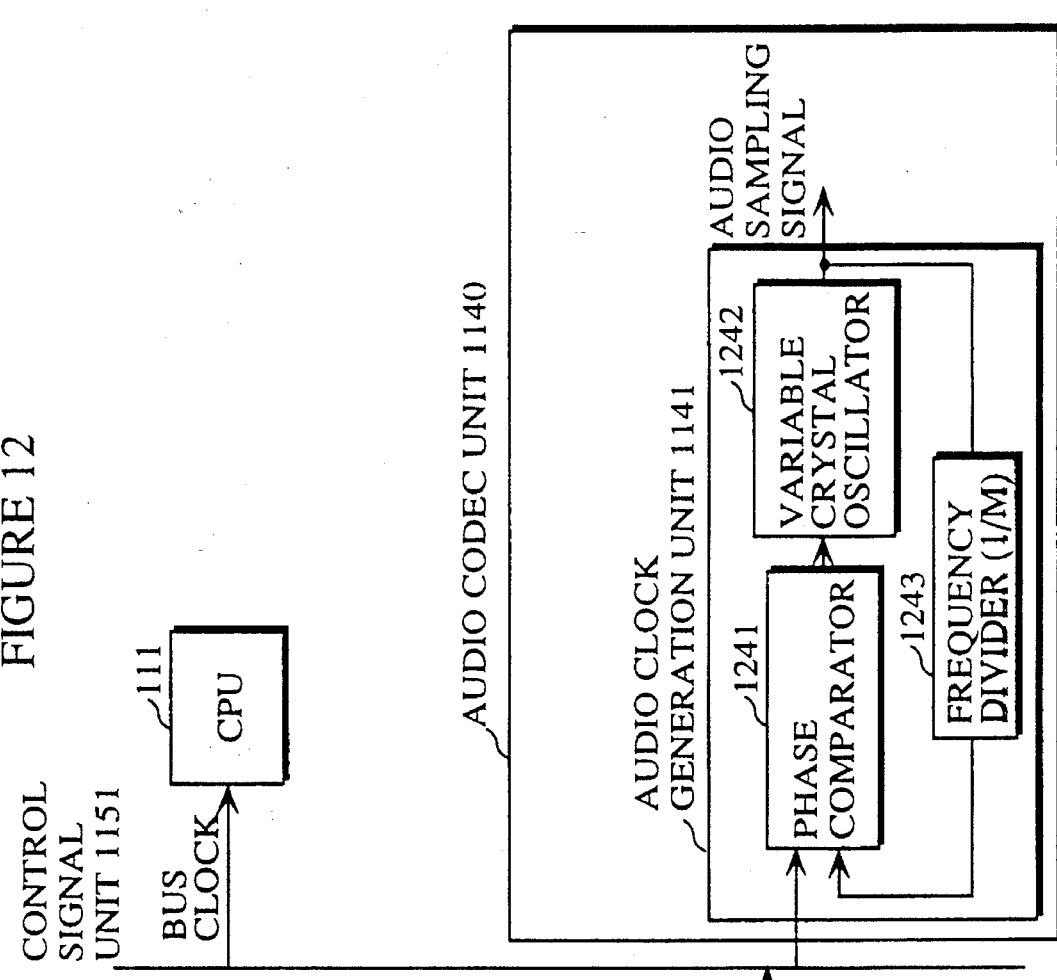
FIG. 12 is a block diagram showing the detailed construction of bus clock generation unit 1121 and the audio clock generation unit 1141.

FIG. 12 is a block diagram showing the detailed construction of bus clock generation unit 1121 and the audio clock generation unit 1141.

The bus clock generation unit 1121 is made up of a phase comparator 1221, a variable crystal oscillator 1222, and a frequency divider 1223.

The phase comparator 1221 outputs the phase difference between the 8 kHz network clock supplied by the network clock control unit 123 and the output of the frequency divider 1223.

The variable crystal oscillator 1222 generates a clock pulse of a frequency of about 10 MHz, and, in addition to outputting this clock pulse to the frequency divider 1223, outputs it as the bus clock to the control signal line 1151.

The frequency divider 1223 divides the frequency of the clock pulse from the variable crystal oscillator 1222 by multiplying it by a value 1/N, for example 8/10000.

Since the phase comparator 1221, the variable crystal oscillator 1222, and the frequency divider 1223 form a PLL circuit, the bus clock generation unit 1121 can generate a bus clock synchronized with the network clock.

The audio clock generation unit 1141 is made up of a phase comparator 1241, a variable crystal oscillator 1242 and a frequency divider 1243.

The phase comparator 1241 outputs the phase difference between the bus clock inputted from the control signal line 1151 and the output of the frequency divider 1243.

The variable crystal oscillator 1242 generates a clock pulse of a frequency of about 8 kHz, and, in addition to outputting this clock pulse to the frequency divider 1243, outputs it as the audio sampling signal to the D/A convertor 141 and the A/D convertor 142.

The frequency divider 1243 multiplies the frequency of the audio sampling signal by 1/M, for example, 10000/8 times.

Since the phase comparator 1241, the variable crystal oscillator 1242 and the frequency divider 1243 form a PLL circuit, the audio clock generation unit 1141 can generate an audio sampling signal synchronized with the network clock.

As described above, by means of the present embodiment, in addition to the effect of the third embodiment, an audio sampling signal can be generated from the network clock by way of the bus clock by the PLL circuits provided in the bus clock generation unit 1121 and the audio clock generation unit 1141, so that an audio sampling signal of the same frequency as the network clock which is in phase with the network clock can be generated.

Embodiment 5

Figure 13:
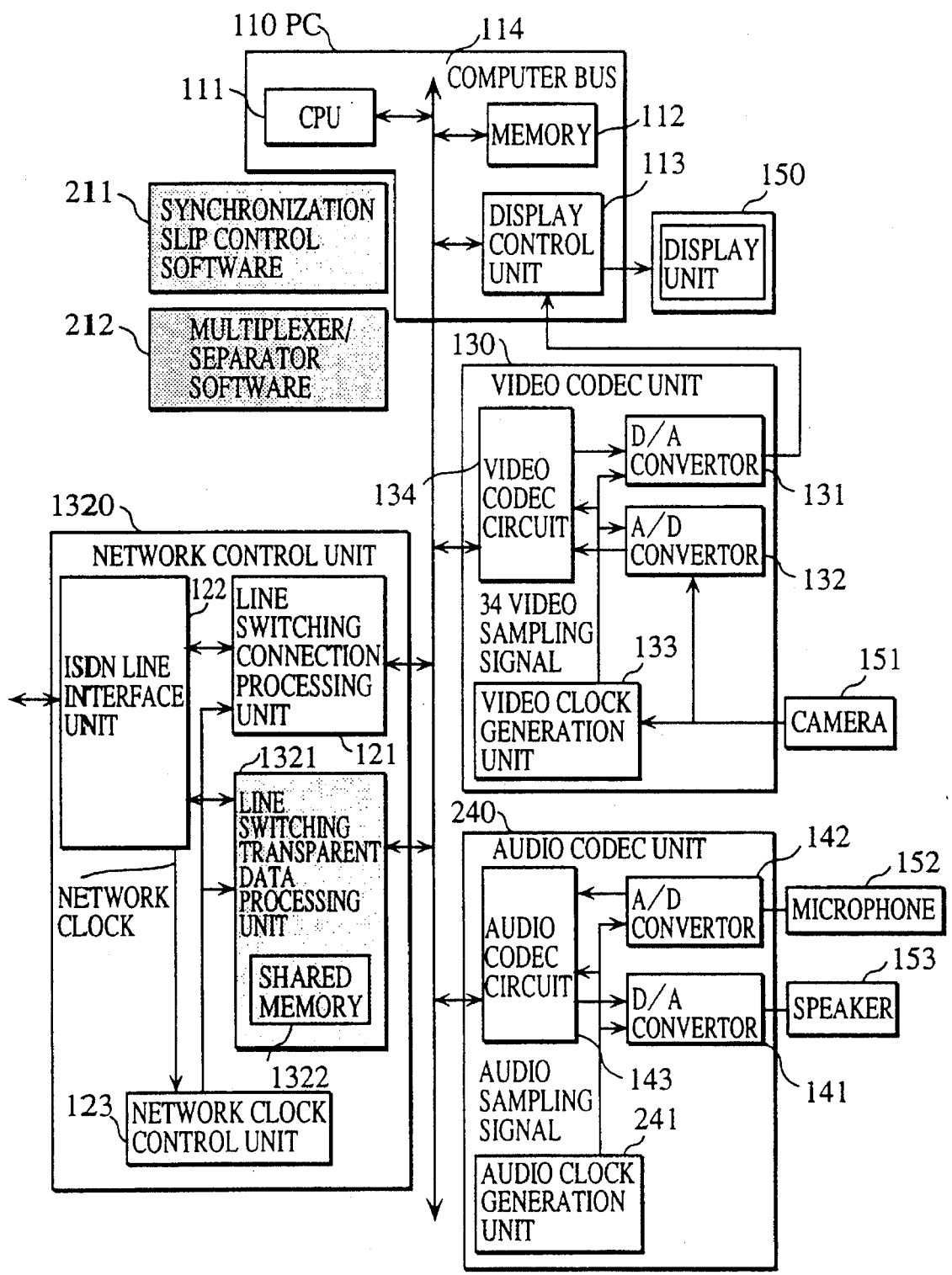
FIG. 13 is a block diagram showing the construction of the PC-based teleconference terminal 1300 according to the fifth embodiment of the present invention.

FIG. 13 is a block diagram showing the construction of the PC-based teleconference terminal 1300 according to the fifth embodiment of the present invention. The PC-based teleconference terminal 1300 of the present embodiment is principally constructed of the same components as PC-based teleconference terminal 100, and the PC-based teleconference terminal 200, so that such components have been given the same reference numerals, and their explanation has been omitted.

The PC 110, the video codec unit 130, and the audio codec unit 240 are all connected, in the same way as the PC-based teleconference terminal 200, to the display unit 150, the camera 151, the microphone 152 and the speaker 153. The memory 112 again stores the synchronization slip control software 211 and the multiplexer/separator software 212.

The network control unit 1320 is made up of a line switching connection processing unit 121, an ISDN line interface unit 122, a network clock control unit 123 and a line switching transparent data processing unit 1321. The line switching transparent data processing unit 1321 additionally includes a shared memory 1322.

The shared memory 1322 has an ISDN line interface unit 122 side and a computer bus 114 side, with simultaneous access of both sides being possible, and is a dual port memory fitted with a DMAC (Direct Memory Access Controller). The CPU 111 accesses the shared memory 1322 via the computer bus 114 in the same way as when accessing the memory 112. In addition, the transfer of AV multiframes between the CPU 111 and the ISDN line interface unit 122 is executed via this DMAC. In order to store the transmission queues, the shared memory 1322 is provided with storage areas, in the same way as shown in FIG. 4 for the first embodiment, such as a transmission video buffer 404, a transmission video descriptor 400, a transmission audio buffer 440, a transmission audio descriptor 430, a transmission buffer 454, and a transmission descriptor 450. In the same way, in order to store the reception queues, the shared memory 1322 is provided with storage areas, in the same way as shown in FIG. 5 for the first embodiment, such as a reception video buffer 504, a reception video descriptor 500, a reception audio buffer 540, a reception audio descriptor 530, a reception buffer 555, and a reception descriptor 550.

It should be noted that aside from the line switching transparent data processing unit 1321 and the shared memory 1322, the PC-based teleconference terminal 1300 is constructed in exactly the same way as the PC-based teleconference terminal 200 in the first embodiment. Therefore, the details of the operational process of the PC-based teleconference terminal 1300 have been omitted, and only a basic explanation will be given.

During reception, the CPU 111, by executing the multiplexer/separator software 212, queues the received AV multiframes in the reception buffer 555 in the shared memory 1322 without transferring to the memory 112, and then setting the storage position of the retrieved frame alignment signal (FAS) as the standard, separates the video code 505, the audio code 541, and the data.

The CPU 111 temporarily queues the separated video code 505 and audio code 541 respectively in the reception video buffer 504 and in the reception audio buffer 540 in the shared memory 1322. A synchronization slip control process is executed for the separated audio code 541 by the CPU 111 executing the synchronization slip control software 211.

Following this, a lip synch process is then executed for video code 505 and audio code 541 queued in the reception video buffer 504 and in the reception audio buffer 540, before they are transferred to the video codec circuit 134 and the audio codec circuit 143, respectively.

In the same way, the CPU 111 queues the video code 405 and the audio code 441 encoded by the video codec circuit 134 and the audio codec circuit 143 in the transmission video buffer 404 and the transmission audio buffer 440 provided in the shared memory 1322, without sending them to the memory 112.

A synchronization slip control process is executed for the audio code 441 by the CPU 111 executing the synchronization slip control software 211.

The CPU 111 then performs a lip-synch process on the video code 405 and the audio code 441 from the transmission video buffer 404 and the transmission audio buffer 440 in the transmission buffer 454 provided in the shared memory 1322, and setting the storage position of the frame alignment signal (FAS) as the standard, composes the AV multiframes. In doing so, the transmission code 455 made up of the AV multiframes are then queued in the transmission buffer 454 provided in the shared memory 1322.

In the manner described above, then, in addition to the effect of the first embodiment, by providing a shared memory 1322, equipped with a DMAC, in the line switching transparent data processing unit 1321, the CPU 111, on transmitting or receiving AV multiframes, need not transfer the audio code and video code to the memory 112, so that a saving in the load of the CPU 111 corresponding to this operation can be made.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A teleconference terminal using a personal computer for sending and receiving video code, audio code and data to and from another teleconference terminal, using an ISDN line switching method wherein AV multiframes are defined for an H series recommendation for CCITT, comprising:

audio coding means for encoding and compressing an inputted audio signal in accordance with an audio sampling signal, for generating transmission audio code and outputting the transmission audio code to a computer bus, as well as receiving reproduction audio code from the computer bus, and generating a reproduction audio signal by decompressing and decoding the reproduction audio code in accordance with the audio sampling signal;

video coding means for encoding and compressing an inputted video signal, for generating transmission video code and outputting the transmission video code to the computer bus, as well as receiving reproduction video code from the computer bus, and generating a reproduction video signal by expanding and decoding the reproduction video code;

AV multiframe conversion means for generating transmission AV multiframes by performing multiplex conversion of the transmission audio code and the transmission video code inputted from the computer bus according to a CCITT recommendation, and outputting the generated transmission AV multiframes to the computer bus;

transfer means for transmitting the transmission AV multiframes inputted from the computer bus via an ISDN line to the other teleconference terminal, and for receiving reproduction AV multiframes from the other teleconference terminal according to a CCITT recommendation via the ISDN line, and outputting the received reproduction AV multiframes to the computer bus;

AV separation means for receiving the received reproduction AV multiframes from the computer bus and for separating the reproduction video code and the reproduction audio code from the received reproduction AV multiframes, as well as outputting the reproduction video code and reproduction audio code to the computer bus;

internal clock supplying means for independently generating an internal clock for the personal computer, as well as supplying the audio sampling signal synchronized with the internal clock to the audio coding means, wherein the audio sampling signal has a frequency of 8 kHz; and adjustment means for adjusting surpluses and shortages in the transmission audio code to be included in the transmission AV multiframes, which occur due to synchronization slips between a network clock of the ISDN line and the internal clock, and surpluses and shortages in the reproduction audio code separated from the reproduction AV multiframes, which occur due to synchronization slips between the network clock of the ISDN line and the internal clock.

2. The teleconference terminal of claim 1, wherein the audio coding means, the video coding means, the transfer means, and the internal clock supplying means are all constructed on a same expansion board for the personal computer, and the AV multiframe conversion means, the AV separation means and the adjustment means are all realized by having a CPU in the personal computer execute a program stored in a memory.

3. The teleconference terminal of claim 2, further comprising:

a transmission buffer provided in the memory of the personal computer for storing the transmission AV multiframes;

a transmission audio buffer provided in the memory of the personal computer for storing the transmission audio code;

a reception buffer provided in the memory of the personal computer for storing the reproduction AV multiframes; and a reception audio buffer provided in the memory of the personal computer for storing the reproduction audio code, wherein the AV multiframe conversion means includes:

a first queuing unit for receiving the transmission audio code from the computer bus and queuing the transmission audio code in units of a fixed length in the transmission audio buffer;

a transmission AV multiframe generation unit for receiving a fixed amount of the transmission audio code from the transmission audio buffer, for executing lip-synching, for arranging a frame alignment signal (FAS), the transmission video code and the transmission audio code, and for generating the transmission AV multiframes in the transmission buffer according to the CCITT recommendation; and a first transfer unit for outputting a fixed amount of the transmission AV multiframes from the transmission buffer to the computer bus, for each time the fixed amount of the transmission AV multiframes are to be transmitted, and the AV separation means includes:

a reception frame storage unit for storing the reproduction AV multiframes received from the computer bus in the reception buffer;

a frame alignment signal detection unit for detecting a storage position of a frame alignment signal (FAS) in the reproduction AV multiframes stored in the reception buffer;

a frame alignment pointer for storing the storage position of the detected frame alignment signal (FAS);

an AV separation unit for receiving a fixed amount of reproduction AV multiframes from the reception buffer, and for separating the reproduction audio code from the reproduction AV multiframes, using as a standard the storage position of the frame alignment signal (FAS) stored in the frame alignment pointer;

a second queuing unit for queuing the separated reproduction audio code in units of a fixed amount in the reception audio buffer; and a second transfer unit for receiving, each time the audio coding means generates a fixed amount of the reproduction audio code, the fixed amount of the reproduction audio code from the reception audio buffer and outputting the reproduction audio code to the computer bus.

4. The teleconference terminal of claim 3, wherein the adjustment means includes:

a first speed difference detection unit for detecting a speed difference between a transfer speed of the transfer means and a transmission audio code generation speed of the audio coding means;

a first stuffing unit for stuffing an appropriate transmission audio code into the transmission audio code when the transfer speed is detected as being greater than the transmission audio code generation speed;

a first destuffing unit for removing (destuffing) an appropriate transmission audio code from the transmission audio code, when the transfer speed is detected as being lower than the transmission audio code generation speed;

a second speed difference detection unit for detecting a speed difference between the transfer speed of the transfer means and a reproduction audio signal generation speed of the audio coding means;

a second stuffing unit for stuffing an appropriate reproduction audio code into the reproduction audio code when the transfer speed is detected as being lower than the reproduction audio code generation speed; and a second destuffing unit for removing (destuffing) an appropriate reproduction audio code from the reproduction audio code, when the transfer speed is detected as being greater than the reproduction audio code generation speed.

5. The teleconference terminal of claim 4, wherein the first speed difference detection unit includes:

a first resident amount detection unit for detecting a resident amount of the transmission audio code in the transmission audio buffer, wherein the first speed difference detection unit, by comparing the detected resident amount of the transmission audio code with a predetermined resident amount upper limit and a predetermined resident amount lower limit, detects the speed difference between the transmission speed of the transfer means and the transmission audio code generation speed of the audio coding means, wherein the second speed difference detection unit includes:

a second resident amount detection unit for detecting a resident amount of the reproduction audio code in the reception audio buffer, wherein the second speed difference detection unit, by comparing the detected resident amount of the reproduction audio code with a predetermined resident amount upper limit and a predetermined resident amount lower limit, detects the speed difference between the reception speed of the transfer means and the reproduction audio signal generation speed of the audio coding means, wherein the adjustment means further includes:

a first priority setting unit for setting a predetermined priority to each part of a fixed amount in the transmission audio code queued in the transmission audio buffer; and a second priority setting unit for setting a predetermined priority to each part of the fixed amount in the reproduction audio code queued in the reception audio buffer, and wherein the first stuffing unit, by having parts of the transmission audio code set with a lowest priority outputted twice from the audio transmission buffer to the transmission AV multiframe generation unit, stuffs the parts of the transmission audio code;

the first destuffing unit, by having parts of the transmission audio code set with a lowest priority outputted from the audio transmission buffer to the transmission AV multiframe generation unit, destuffs the parts of the transmission audio code;

the second stuffing unit, by having parts of the reproduction audio code set with a lowest priority outputted twice from the audio reception buffer to the second transfer unit, stuffs the parts of the reproduction audio code; and the second destuffing unit, by not having parts of the reproduction audio code set with a lowest priority outputted from the audio reproduction buffer to the second transfer unit and so discarded, destuffs the parts of the reproduction audio code.

6. The teleconference terminal of claim 5, wherein the first priority setting unit includes a first sound energy detection unit for calculating, when the audio coding means is encoding using PCM according to a G.711 recommendation for CCITT, sound energy in each of the parts of the fixed amount in the transmission audio code queued in the transmission audio buffer by finding a sum of squares for every audio sample value, and the first priority setting unit sets the calculated sound energy as the priority of each of the parts of the fixed amount in the transmission audio code, and the second priority setting unit includes a second sound energy detection unit for calculating, when the audio coding means is encoding using PCM according to the G.711 recommendation for CCITT, sound energy in each of the parts of the fixed amount in the reproduction audio code queued in the reception audio buffer by finding a sum of squares for every audio sample value, and the second priority setting unit sets the calculated sound energy as the priority of each of the parts of the fixed amount in the reproduction audio code.

7. The teleconference terminal of claim 5, wherein the first priority setting unit includes a first addition value calculator unit for calculating, when the audio coding means is encoding using PCM according to a G.726 recommendation for CCITT, an addition value for differential information for the parts of the fixed amount in the transmission audio code queued in the transmission audio buffer, and the first priority setting unit sets the calculated addition value for differential information as the priority of each of the parts of the fixed amount in the transmission audio code, and the second priority setting unit includes a second addition value calculator unit for calculating, when the audio coding means is encoding using PCM according to the G.726 recommendation for CCITT, an addition value for differential information for the parts of the fixed amount in the reproduction audio code queued in the reception audio buffer, and the second priority setting unit sets the calculated addition value for differential information as the priority of each of the parts of the fixed amount in the reproduction audio code.

8. The teleconference terminal of claim 5, wherein the first priority setting unit includes a first calculator unit for calculating, when the audio coding means is encoding using ADPCM according to a G.726 recommendation for CCITT, a sum of squares of differential information for the parts of the fixed amount in the transmission audio code queued in the transmission audio buffer, and the first priority setting unit sets the calculated sum of squares of differential information as the priority of each of the parts of the fixed amount in the transmission audio code, and the second priority setting unit includes a second addition value calculator unit for calculating, when the audio coding means is encoding using ADPCM according to the G.726 recommendation for CCITT, a sum of squares of differential information for the parts of the fixed amount in the reproduction audio code queued in the reception audio buffer, and the second priority setting unit sets the calculated sum of squares of differential information as the priority of each of the parts of the fixed amount in the reproduction audio code.

9. The teleconference terminal of claim 4, wherein the first speed difference detection unit includes:
a first resident amount detection unit for detecting a resident amount of the transmission audio code in the transmission audio buffer, wherein the first speed difference detection unit, by comparing the detected resident amount of the transmission audio code with a predetermined resident amount upper limit and a predetermined resident amount lower limit, detects the speed difference between the transmission speed of the transfer means and the transmission audio code generation speed of the audio coding means, wherein the second speed difference detection unit includes:
a second resident amount detection unit for detecting a resident amount of the reproduction audio code in the reception audio buffer, wherein the second speed difference detection unit, by comparing the detected resident amount of the reproduction audio code with a predetermined resident amount upper limit and a predetermined resident amount lower limit, detects the speed difference between the reception speed of the transfer means and the reproduction audio signal generation speed of the audio coding means, wherein the adjustment means further includes:
a first priority setting unit for setting a predetermined priority to each part of the fixed amount in the transmission audio code queued in the transmission audio buffer;

a second priority setting unit for setting a predetermined priority to each part of the fixed amount in the reproduction audio code queued in the reception audio buffer;

a transmission interpolation audio code generation unit for calculating average values of audio sample values for at least two out of a part of the audio transmission code with a lowest priority, a part of the audio transmission code queued so as to follow after the part of the audio transmission code with the lowest priority, and a part of the audio transmission code queued so as to precede the part of the audio transmission code with the lowest priority, and for generating transmission interpolation audio code with the calculated average values as audio sample values; and a reproduction interpolation audio code generation unit for calculating average values of audio sample values for at least two out of a part of the audio reproduction code with a lowest priority, a part of the audio reproduction code queued so as to follow after the part of the audio reproduction code with the lowest priority, and a part of the audio reproduction code queued so as to precede the part of the audio reproduction code with the lowest priority, and for generating reproduction interpolation audio code with the calculated average values as audio sample values, wherein the first stuffing unit, by having the transmission interpolation audio code outputted following a part of the transmission audio code set with a lowest priority in the audio transmission buffer to the transmission AV multiframe generation unit, stuffs the transmission interpolation audio code;

the first destuffing unit, by having the transmission interpolation audio code outputted to the transmission AV multiframe generation unit in place of the part of the transmission audio code set with a lowest priority and the part of the audio transmission information queued so as to follow directly after the part of the audio transmission code with the lowest priority in the audio transmission buffer, destuffs the part of the transmission audio code with the lowest priority;

the second stuffing unit, by having the reproduction interpolation audio code outputted following a part of the reproduction audio code set with a lowest priority from the audio reception buffer to the second transfer unit, stuffs the reproduction interpolation audio code; and the second destuffing unit, by having the reproduction interpolation audio code outputted to the second transfer unit in place of the part of the reproduction audio code set with a lowest priority and the part of the audio reproduction information queued so as to follow directly after the part of the audio reproduction code with the lowest priority in the audio reception buffer, destuffs the part of the reproduction audio code with the lowest priority.

10. The teleconference terminal of claim 9, wherein the first priority setting unit includes a first sound energy detection unit for calculating, when the audio coding means is encoding using PCM according to a G.711 recommendation for CCITT, sound energy in each of the parts of the fixed amount in the transmission audio code queued in the transmission audio buffer by finding a sum of squares for every audio sample value, and the first priority setting unit sets the calculated sound energy as the priority of each of the parts of the fixed amount in the transmission audio code, and the second priority setting unit includes a second sound energy detection unit for calculating, when the audio coding means is encoding using PCM according to the G.711 recommendation for CCITT, sound energy in each of the parts of the fixed amount in the reproduction audio code queued in the reception audio buffer by finding a sum of squares for every audio sample value, and the second priority setting unit sets the calculated sound energy as the priority of each of the parts of the fixed amount in the reproduction audio code.

11. The teleconference terminal of claim 9, wherein the first priority setting unit includes a first addition value calculator unit for calculating, when the audio coding means is encoding using PCM according to a G.726 recommendation for CCITT, an addition value for differential information for the parts of the fixed amount in the transmission audio code queued in the transmission audio buffer, and the first priority 'setting unit sets the calculated addition value for differential information as the priority of each of the parts of the fixed amount in the transmission audio code, and the second priority setting unit includes a second addition value calculator unit for calculating, when the audio coding means is encoding using PCM according to the G.726 recommendation for CCITT, an addition value for differential information for the parts of the fixed amount in the reproduction audio code queued in the reception audio buffer, and the second priority setting unit sets the calculated addition value for differential information as the priority of each of the parts of the fixed amount in the reproduction audio code.

12. The teleconference terminal of claim 9, wherein the first priority setting unit includes a first calculator unit for calculating, when the audio coding means is encoding using ADPCM according to a G.726 recommendation for CCITT, a sum of squares of differential information for the parts of the fixed amount in the transmission audio code queued in the transmission audio buffer, and the first priority setting unit sets the calculated sum of squares of differential information as the priority of each of the parts of the fixed amount in the transmission audio code, and the second priority setting unit includes a second addition value calculator unit for calculating, when the audio coding means is encoding using ADPCM according to the G.726 recommendation for CCITT, a sum of squares of differential information for the parts of the fixed amount in the reproduction audio code queued in the reception audio buffer, and the second priority setting unit sets the calculated sum of squares of differential information as the priority of each of the parts of the fixed amount in the reproduction audio code.

13. The teleconference terminal of claim 3, wherein the transfer means includes:

an ISDN line interface unit for transmitting the transmission AV multiframes on the ISDN line and for receiving the reproduction AV multiframes from the ISDN line;

a shared memory which is a dual port memory which can be simultaneously accessed by the CPU in the personal computer and the ISDN line interface unit; and a DMAC for directly storing the received reproduction AV multiframes in the shared memory and for transferring the transmission AV multiframes stored in the shared memory to the ISDN line interface unit.

14. The teleconference terminal of claim 13, wherein the adjustment means includes:

a first speed difference detection unit for detecting a speed difference between a transfer speed of the transfer means and a transmission audio code generation speed of the audio coding means;

a first stuffing unit for stuffing an appropriate transmission audio code into the transmission audio code when the transfer speed is detected as being greater than the transmission audio code generation speed;

a first destuffing unit for removing (destuffing) an appropriate transmission audio code from the transmission audio code, when the transfer speed is detected as being lower than the transmission audio code generation speed;

a second speed difference detection unit for detecting a speed difference between the transfer speed of the transfer means and a reproduction audio signal generation speed of the audio coding means;

a second stuffing unit for stuffing an appropriate reproduction audio code into the reproduction audio code when the transfer speed is detected as being lower than the reproduction audio code generation speed; and a second destuffing unit for removing (destuffing) an appropriate reproduction audio code from the reproduction audio code, when the transfer speed is detected as being greater than the reproduction audio code generation speed.

15. The teleconference terminal of claim 14, wherein the first speed difference detection unit includes:

a first resident amount detection unit for detecting a resident amount of the transmission audio code in the transmission audio buffer, wherein the first speed difference detection unit, by comparing the detected resident amount of the transmission audio code with a predetermined resident amount upper limit and a predetermined resident amount lower limit, detects the speed difference between the transmission speed of the transfer means and the transmission audio code generation speed of the audio coding means, wherein the second speed difference detection unit includes:

a second resident amount detection unit for detecting a resident amount of the reproduction audio code in the reception audio buffer, wherein the second speed difference detection unit, by comparing the detected resident amount of the reproduction audio code with a predetermined resident amount upper limit and a predetermined resident amount lower limit, detects the speed difference between the reception speed of the transfer means and the reproduction audio signal generation speed of the audio coding means, wherein the adjustment means further includes:

a first priority setting unit for setting a predetermined priority to each part of a fixed amount in the transmission audio code queued in the transmission audio buffer; and a second priority setting unit for setting a predetermined priority to each part of the fixed amount in the reproduction audio code queued in the reception audio buffer, and wherein the first stuffing unit, by having parts of the transmission audio code set with a lowest priority outputted twice from the audio transmission buffer to the transmission AV multiframe generation unit, stuffs the parts of the transmission audio code;

the first destuffing unit, by having parts of the transmission audio code set with a lowest priority outputted from the audio transmission buffer to the transmission AV multiframe generation unit, destuffs the parts of the transmission audio code;

the second stuffing unit, by having parts of the reproduction audio code set with a lowest priority outputted twice from the audio reception buffer to the second transfer unit, stuffs the parts of the reproduction audio code; and the second destuffing unit, by not having parts of the reproduction audio code set with a lowest priority outputted from the audio reproduction buffer to the second transfer unit and so discarded, destuffs the parts of the reproduction audio code.

16. The teleconference terminal of claim 15, wherein the first priority setting unit includes a first sound energy detection unit for calculating, when the audio coding means is encoding using PCM according to a G.711 recommendation for CCITT, sound energy in each of the parts of the fixed amount in the transmission audio code queued in the transmission audio buffer by finding a sum of squares for every audio sample value, and the first priority setting unit sets the calculated sound energy as the priority of each of the parts of the fixed amount in the transmission audio code, and the second priority setting unit includes a second sound energy detection unit for calculating, when the audio coding means is encoding using PCM according to the G.711 recommendation for CCITT, sound energy in each of the parts of the fixed amount in the reproduction audio code queued in the reception audio buffer by finding a sum of squares for every audio sample value, and the second priority setting unit sets the calculated sound energy as the priority of each of the parts of the fixed amount in the reproduction audio code.

17. The teleconference terminal of claim 15, wherein the first priority setting unit includes a first addition value calculator unit for calculating, when the audio coding means is encoding using PCM according to a G.726 recommendation for CCITT, an addition value for differential information for the parts of the fixed amount in the transmission audio code queued in the transmission audio buffer, and the first priority setting unit sets the calculated addition value for differential information as the priority of each of the parts of the fixed amount in the transmission audio code, and the second priority setting unit includes a second addition value calculator unit for calculating, when the audio coding means is encoding using PCM according to the G.726 recommendation for CCITT, an addition value for differential information for the parts of the fixed amount in the reproduction audio code queued in the reception audio buffer, and the second priority setting unit sets the calculated addition value for differential information as the priority of each of the parts of the fixed amount in the reproduction audio code.

18. The teleconference terminal of claim 15, wherein the first priority setting unit includes a first calculator unit for calculating, when the audio coding means is encoding using ADPCM according to a G.726 recommendation for CCITT, a sum of squares of differential information for the parts of the fixed amount in the transmission audio code queued in the transmission audio buffer, and the first priority setting unit sets the calculated sum of squares of differential information as the priority of each of the parts of the fixed amount in the transmission audio code, and the second priority setting unit includes a second addition value calculator unit for calculating, when the audio coding means is encoding using ADPCM according to the G.726 recommendation for CCITT, a sum of squares of differential information for the parts of the fixed amount in the reproduction audio code queued in the reception audio buffer, and the second priority setting unit sets the calculated sum of squares of differential information as the priority of each of the parts of the fixed amount in the reproduction audio code.

19. The teleconference terminal of claim 2, which does not comprise the internal clock supplying means and the adjustment means, wherein the transfer means includes a clock distribution circuit for distributing the network clock of the ISDN line, and a special connector is formed in each of the transfer means and the audio coding means, with a private clock signal line connected between the special connectors, so that the network clock distributed by the clock distribution circuit is supplied via the private clock signal line to the audio coding means.

20. The teleconference terminal of claim 2, comprising in place of the internal clock supplying means and the adjustment means:
- a count-up pulse generation unit for generating a same number of pulses as a number of audio samples included in a fixed amount of the reproduction audio code inputted at a time by the audio coding means from the computer bus;
- a voltage control oscillator for outputting a clock signal of a frequency set in accordance with an applied voltage;
- an updown counter for inputting the clock signal from the voltage control oscillator as a count-down signal and inputting the pulses from the count-up pulse generation unit as a count-up signal, and for outputting a difference between the count-up signal and the count-down signal; and
- an integrator for smoothing an output of the updown counter by integrating, and outputting to the voltage control oscillator,
- wherein an output of the voltage control oscillator is supplied to the audio coding means as the audio sampling signal.

21. The teleconference terminal of claim 20, wherein the count-up pulse generation unit includes:
- an I/O decoder for decoding a transfer address of the fixed amount of the reproduction audio code transferred via the computer bus, and, when the transfer address is the audio coding means, for generating a write pulse for writing data in the reproduction audio code into the audio coding means, as well as generating a register write pulse;
- an audio setting register for retrieving a number of audio samples written at a start of the reproduction audio code in accordance with the register write pulse and for storing the number of audio samples;
- a flip flop which is set according to the write pulse for the audio coding means and reset by a clear signal;
- a counter for counting up a number of clock pulses inputted while the flip flop is set, and for being reset to [1] when the flip flop is reset;
- an agreement circuit for outputting the clear signal to the flip flop when a count value of the counter is equal to the number of audio samples stored by the audio setting register;
- an AND circuit for outputting the clock pulses as the count-up signal while the flip flop is set; and
- a clock oscillator for supplying the clock pulses to the flip flop, the counter and the AND gate.

22. The teleconference terminal of claim 2, comprising in place of the internal clock supplying means and the adjustment means:
- a bus clock generation unit for multiplying the network clock from the transfer means and generating a bus clock for the computer bus synchronized to the network clock; and
- an audio sampling signal generation unit generation unit for dividing the bus clock, for generating the audio sampling signal synchronized to the bus clock and supplying the audio sampling signal to the audio coding means.

23. The teleconference terminal of claim 1, comprising in place of the internal clock supplying means and the adjustment means:
- a count-up pulse generation unit for generating a same number of pulses as a number of audio samples included in a fixed amount of the reproduction audio code inputted at a time by the audio coding means from the computer bus;
- a voltage control oscillator for outputting a clock signal of a frequency set in accordance with an applied voltage;
- an updown counter for inputting the clock signal from the voltage control oscillator as a count-down signal and inputting the pulses from the count-up pulse generation unit as a count-up signal, and for outputting a difference between tie count-up signal and the count-down signal; and
- an integrator for smoothing an output of the updown counter by integrating, and outputting to the voltage control oscillator,
- wherein an output of the voltage control oscillator is supplied to the audio coding means as the audio sampling signal.

24. The teleconference terminal of claim 1, wherein the count-up pulse generation unit includes:
- an I/O decoder for decoding a transfer address of the fixed amount of the reproduction audio code transferred via the computer bus, and, when the transfer address is the audio coding means, for generating a write pulse for writing data in the reproduction audio code into the audio coding means, as well as generating a register write pulse;
- an audio setting register for retrieving a number of audio samples written at a start of the reproduction audio code in accordance with the register write pulse and for storing the number of audio samples;
- a flip flop which is set according to the write pulse for the audio coding means and reset by a clear signal;
- a counter for counting up a number of clock pulses inputted while the flip flop is set, and for being reset to [1] when the flip flop is reset;
- an agreement circuit for outputting the clear signal to the flip flop when a count value of the counter is equal to the number of audio samples stored by the audio setting register;
- an AND circuit for outputting the clock pulses as the count-up signal while the flip flop is set; and
- a clock oscillator for supplying the clock pulses to the flip flop, the counter and the AND gate.

25. The teleconference terminal of claim 1, wherein comprising in place of the internal clock supplying means and the adjustment means:
- a bus clock generation unit for multiplying the network clock from the transfer means and generating a bus clock for the computer bus synchronized to the network clock; and
- an audio sampling signal generation unit generation unit for dividing the bus clock, for generating the audio sampling signal synchronized to the bus clock and supplying the audio sampling signal to the audio coding means.

* * * * *